US008050446B2

(12) United States Patent
Kountchev et al.

(10) Patent No.: US 8,050,446 B2
(45) Date of Patent: Nov. 1, 2011

(54) METHOD AND SYSTEM FOR DIGITAL WATERMARKING OF MULTIMEDIA SIGNALS

(75) Inventors: Roumen Kirilov Kountchev, Sofia (BG); Vladimir Todorov Todorov, Sofia (BG); Roumiana Atanassova Kountcheva, Sofia (BG); Mariofanna Geourgieva Milanova, Little Rock, AR (US); Charles Wesley Ford, Jr., McDonough, GA (US)

(73) Assignee: The Board of Trustees of the University of Arkansas, Little Rock, AR (US)

( * ) Notice: Subject to any disclaimer, the term of this patent is extended or adjusted under 35 U.S.C. 154(b) by 1616 days.

(21) Appl. No.: 11/180,334

(22) Filed: Jul. 12, 2005

(65) Prior Publication Data

US 2007/0014428 A1    Jan. 18, 2007

(51) Int. Cl.
*G06K 9/00*    (2006.01)
(52) U.S. Cl. .................. 382/100; 375/E7.018; 704/231
(58) Field of Classification Search .................. 382/100; 375/E7.018; 704/231
See application file for complete search history.

(56) References Cited

U.S. PATENT DOCUMENTS 5,983,176 A * 11/1999 Hoffert et al. ................. 704/233
7,365,658 B2 * 4/2008 Todorov et al. ................. 341/63

FOREIGN PATENT DOCUMENTS
WO    WO 01/10130    *    2/2001

OTHER PUBLICATIONS

Kountchev et al., "Multi-layer Image Transmission with Inverse Pyramidal Decomposition", 2005, Springer-Verlag, 179-196.*
Kountchev et al., "Multimedia Watermarking with Complex Hadamard Transform in the Inverse Pyramid Decomposition", 2003, IEEE, 305-310.*
Kountchev et al., "Lossless Image Compression with IDP and Adaptive RLC", Jun. 2004, CISST '04, 608-612.*
Kountchev et al., "Inverse pyramidal decomposition with multiple DCT", 2002, Signal Processing: Image Communication, 201-218.*
Kountchev et al., "Lossless Image Compression With IDP Decomposition", 2004, ICEST '04, 127-130.*
Kountchev et al., "Fingerprints compression with IDP", Jun./Jul. 2005, ICEST '05, 661-664.*
Milanova et al., "Lossless Data Compression for Image Decomposition With Recursive IDP Algorithm", Aug. 2004, ICPR, 823-826.*
Milanova et al., "Lossless Compression of Contour Images, Representing American Sign Language", May 2005, GETS.*
Hsieh et al., "Hiding Digital Watermarks Using Multiresolution Wavelet Transform", 2001, IEEE Transactions on Industrial Electronics, vol. 48, No. 5, 875-882.*

* cited by examiner

*Primary Examiner* — Vikkram Bali
*Assistant Examiner* — Katrina Fujita
(74) *Attorney, Agent, or Firm* — J. Charles Dougherty

(57) ABSTRACT

Disclosed is a method and system for digital watermarking of multimedia signals. The input multimedia signal is represented using an inverse difference pyramid decomposition. Spectrum coefficients may be calculated for each level of the pyramid using a new kind of complex Hadamard transform, the matrix of which is distinguished from the known ones by the fact that only one-fourth of its coefficients are complex numbers. The phases of a previously selected part of the low-frequency coefficients are modified with the watermark data, limiting the angles of the phase changes in a gap of several degrees only. After an inverse complex Hadamard Transform, the values of the coefficients from all pyramid levels are summed up and the result is the watermarked signal. The watermark can contain multiple independent levels for each level of the pyramid.

51 Claims, 6 Drawing Sheets

METHOD AND SYSTEM FOR DIGITAL WATERMARKING OF MULTIMEDIA SIGNALS

BACKGROUND

The present invention relates to methods and systems for "digital watermarking" of multimedia signals, that is, methods and systems for encoding information in multimedia signals that may be used to verify authenticity or otherwise add information to the signals. In particular, the present invention is directed to a digital watermarking method and system that utilizes an inverse difference pyramid decomposition.

The art includes a variety of approaches to digital watermarking for multimedia signals, including audio and video signals and still images. U.S. Pat. Nos. 5,404,377 and 5,473,631 to Moses disclose various systems for imperceptibly embedding data into audio signals, particularly focusing on neural network implementations and perceptual coding details. U.S. Pat. No. 5,574,962 to Fardeau et al. teaches a method for identifying a program including a sound signal, where the method is based on adding an inaudible encoded digital data in predefined frequencies. U.S. Pat. No. 5,450,490 to Jensen et al. teaches an apparatus and method for encoding and decoding audio signals, where the code is included in at least one frequency component of the processed audio signal. The frequency is selected using the HAS psycho-acoustic model. U.S. Pat. No. 5,905,800 to Moskowitz et al. teaches a method for applying a digital watermark to a content signal using a watermarking key. The watermarking key includes a binary sequence and information describing the application of that binary sequence to the content signal. The digital watermark is then encoded within the content signal at one or more locations determined by the watermarking key. European Patent No. EP0581317 discloses a system for redundantly marking images with multi-bit identification codes. Each bit of the code is manifested as a slight increase or decrease in pixel values around a plurality of spaced apart "signature points." Decoding proceeds by computing a difference between a suspect image and the original image, and checking for pixel perturbations around the signature points.

There are various consortium research efforts underway in Europe on copyright marking of video and multimedia. A survey of techniques is found in "Access Control and Copyright Protection for Images (ACCOPI), WorkPackage 8: Watermarking," June, 1995, which is incorporated herein by reference. A new project, termed TALISMAN, appears to extend certain of the ACCOPI work. Zhao and Koch, researchers active in these projects, provide a Web-based electronic media marking service known as Syscop. In addition, Highwater FBI, Ltd., of Great Britain, has introduced a software product that is believed to imperceptibly embed identifying information into photographs and other graphical images. This technology is the subject of PCT publication WO 95/20291.

U.S. Patent Application Publication No. 20040022444 is directed to a method and apparatus for identifying an object by encoding physical attributes of the object where the encoded information is utilized as at least one element for composing a digital watermark for the object. In a disclosed embodiment, the physical attributes of the object are utilized as a key for accessing information included in a digital watermark for the object.

U.S. Pat. No. 6,078,664 to Moskowitz et al. teaches that Z-transform calculations may be used to encode and decode carrier signal independent data (e.g., digital watermarks) to a digital sample stream. Deterministic and non-deterministic components of a digital sample stream signal may be analyzed for the purposes of watermark encoding. The watermark may be encoded in a manner such that it is concentrated primarily in the non-deterministic signal components of the carrier signal. The signal components can include a discrete series of digital samples and/or a discreet series of carrier frequency sub-bands of the carrier signal. Z-transform calculations may be used to measure the desirability of particular locations and a sample stream in which to encode the watermarks.

U.S. Pat. No. 6,205,249 to Moskowitz teaches multiple transform utilization and applications for secure digital watermarking. Digital blocks in digital information to be protected are transformed into the frequency domain using a fast Fourier transform. A plurality of frequencies and associated amplitudes are identified for each of the transformed digital blocks and a subset of the identified amplitudes is selected for each of the digital blocks using a primary mask from a key. Message information is selected from a message using a transformation table generated with a convolution mask. The chosen message information is encoded into each of the transformed digital blocks by altering the selected amplitudes based on the selected message information.

U.S. Pat. No. 5,889,868 to Moskowitz et al. teaches that digital watermarks may be optimally suited to particular transmission, distribution and storage mediums. Watermark application parameters can also be adapted to the individual characteristics of a given digital sample stream. Watermark information can be either carried in individual samples or in relationships between multiple samples, for example, using the waveform shape. The highest quality of a given content signal may be maintained as it is mastered, with the watermark suitably hidden, taking into account usage of digital filters and error correction. The quality of the underlying content signals may be used to identify and highlight advantageous locations for the insertion of digital watermarks. The watermark is integrated as closely as possible to the content signal, at a maximum level to force degradation of the content signal when attempts are made to remove the watermarks.

U.S. Pat. No. 5,687,236 to Moskowitz et al. teaches an apparatus and method for encoding and decoding additional information into a stream of digitized samples in an integral manner, using spatial keys. The information is contained in the samples, not appended to the sample stream. The method does not cause a significant degradation to the sample stream. The method is used to establish ownership of copyrighted digital multimedia content and to provide a disincentive to piracy of such material.

U.S. Patent Application Publication No. 20030200439 to Moskowitz teaches a method and system for transmitting streams of data. The method comprises the steps of receiving a stream of data; organizing the stream of data into a plurality of packets; generating a packet watermark associated with the stream of data; combining the packet watermark with each of the plurality of packets to form watermarked packets; and transmitting at least one of the watermarked packets across a network. The system may utilize computer code to generate a bandwidth rights certificate that may include at least one cryptographic credential; routing information for the transmission; and, optionally, a digital signature of a certificate owner; a unique identification code of a certificate owner; a certificate validity period; and pricing information for use of bandwidth.

U.S. Pat. No. 6,674,876 to Hannigan et al. teaches a method and system for time-frequency domain watermarking of media signals, such as audio and video signals. An encoding method divides the media signal into segments, transforms each segment into a time-frequency representation, and computes a time-frequency domain watermark signal based on the time frequency representation. The method then combines the time-frequency domain watermark signal with the media signal to produce a watermarked media signal. To embed a message using this method, one may use peak modulation, pseudorandom noise modulation, statistical feature modulation, and the like.

A review of the literature reveals that the various known digital watermarking techniques may be categorized as either spatial domain techniques or frequency domain techniques. The spatial domain techniques include least significant bit (LSB) substitution and a correlation-based approach. There are many variants of LSB substitution. This technique, however, essentially involves embedding the watermark by replacing the least significant bit of the image data with a bit of the watermark data. Variations of this technique may also involve other approaches such as converting the watermark sequence into a pseudo-random noise (PN) sequence, which is then embedded into the image, or repeated embedding of the watermark when the watermark is much smaller than the host image. Detection can be performed visually or using correlation methods. In the correlation-based approach, the watermark is converted into a long PN sequence, which is then weighted and added to the host image with some gain factor.

One of the frequency-domain techniques is the Discrete Cosine Transform (DCT) approach. The DCT is a real-domain transform, which represents the entire image as coefficients of different cosine frequencies (which are the basis vectors for this transform). The DCT of the image is calculated by taking eight-by-eight blocks of the image, which are then transformed individually. The two-dimensional DCT of an image gives the result matrix such that the top left corner represents the lowest frequency coefficient while the bottom right corner is the highest frequency coefficient. The DCT technique forms the basis of the Joint Photographic Experts Group (JPEG) image compression algorithm, which is one of the most widely used image data storage formats. The DCT approaches are able to withstand some forms of attack very well such as low-pass/high-pass filtering and median filtering. Mid-band coefficient exchange is a simple DCT variant in which the coefficients of data blocks are exchanged with identical quantization levels as per the standard JPEG color quantization table, so that one coefficient, say (4,1), is greater than the other coefficient, say (3,2), if the bit is "1," and less if the bit is "0." Another DCT variant, even-odd quantization, attempts to quantize the obtained DCT results and change them all to even numbers in the case that the bit to be encoded is "0," and to odd numbers if it is "1." An advantage of this approach is that there is negligible visual change in the image. Still another DCT variant is Differential Energy Watermarking (DEW), which involves altering the energy levels of two DCT block groups so that $E_A < E_B$ if the bit is "1." Before the alteration to the energy levels is made, the DCT blocks are randomly shuffled and then these pairs of A-B blocks are randomly selected in the image, which adds to the security of the data. Yet another DCT approach is CDMA, which involves the insertion of data of length greater than needed to send the information optimally. The technique involves the generation of a pseudo-random sequence based upon a key, and embedding is carried out according to the watermark message.

Another set of frequency domain approaches are the wavelet-based techniques. These techniques involve the embedding of information in the LH (low-high) blocks of the wavelet transform of the image. Changes to these regions are not noticed by observers due to characteristics of the Human Visual System (HVS). These are also utilized for fragile watermarking which is a significant tool for content authentication.

Still another frequency domain approach is the FFT-based technique. In this technique, the watermark is added to the image as a band-limited signal in a circular pattern around the center (DC) frequency. This makes this approach rotationally resilient. This approach is also called the Circular Symmetric Watermarking Technique.

Yet another frequency domain approach is the Fourier-Mellin transform technique. This relatively new technique has arisen out of the need for watermarking techniques that are Rotation, Scale and Translation invariant (RST-invariant). This approach involves creating a Log Polar map of the FFT of the image and embedding information in the FFT of the Log Polar Map. This method is said to be extremely RST invariant and uses an RST invariant watermark.

Finally, another frequency domain approach is phase modulation. In this technique, the phases of pre-selected complex-conjugated coefficients of the orthogonal DFT (Discrete Fourier Transform) or UCHT (Unified Complex Hadamard Transform) are modulated with the watermark information. Since the phase modulation approach is more resilient than the amplitude approach against noises and fraud attempts, this approach has certain advantages, based on changing the amplitudes of selected spectrum coefficients. The DFT has higher computational complexity than UCHT and lower resistance against changes in the spectrum coefficients phases, due to the noises in the communication channel. Also, half of the coefficients in every row of the UCHT matrix are complex. As a result, all of the coefficients of the discrete spectrum are complex as well. For this reason, the computational complexity of UCHT is higher than, for example, the Hadamard transform based on a real matrix, consisting of elements with values +1 and −1 only. A watermarking system has been developed based on two-dimensional UCHT, in which the watermark elements are embedded in the phases of randomly selected spectrum coefficients of the transformed blocks with size eight-by-eight pixels, positioned in the LL (low-low) frequency band of the classic (non-inverse) image pyramid.

A new type of decomposition, the Inverse Difference Pyramid, has been applied to digital image encoding and compression. Published International Application No. WO 01/10130, incorporated herein by reference, describes this technique. The image is approximated with a polynomial function whose coefficients are obtained with regression analysis or obtained with an inverse orthogonal transform of the input image after retaining only a few of its low-frequency coefficients. These coefficients represent the "zero" (top) level of the pyramid. The next pyramid level is obtained when its approximation, defined with the coefficients from the "zero" level, is subtracted from the input image. The resulting difference image is divided into four sub-images with the same size and form, and after processing in a similar fashion the resulting approximated images are obtained. A recursive image decomposition algorithm is employed, which does not require interpolation.

SUMMARY OF THE INVENTION

The aim of the invention is the creation of a method for digital watermarking of media signals utilizing the Inverse Difference Pyramid decomposition. The inventors have recognized numerous advantages from the use of the Inverse Difference Pyramid approach in digital watermarking, as will be described hereinafter. The present invention is further dependent in certain embodiments upon the use of a new transform called the Complex Hadamard Transform, utilizing a new matrix. In accordance with the present invention, in the process of embedding the watermark, the discrete input signal is divided into fragments with $2^n$ elements each (for a two-dimensional block, $2^n \times 2^n$ elements). In accordance with certain embodiments, processing of a selected fragment starts with its amplitude normalization. This operation is performed in the case that the maximum amplitude in this fragment is smaller than the possible maximum one. In this case all the elements in the fragment are multiplied with the normalization coefficient, obtained in result of the division of the maximum possible amplitude and the maximum one in the fragment. The processing continues with the presentation of the fragment with Inverse Difference Pyramid decomposition. For this purpose the fragment data is processed with a complex orthogonal transform, using only a part of the low-frequency coefficients of the discrete spectrum, selected in advance. As a result, an approximation is used instead of the original fragment, defined with the selected participating coefficients. The corresponding truncated transform could be calculated with every known complex orthogonal transform, but in the preferred embodiment a new kind of the complex Hadamard transform is used, in the matrix of which only one-fourth of the coefficients are complex numbers. The values of the selected spectrum coefficients build the initial "zero" level of the inverse pyramid.

To obtain the next pyramid level, the difference between the original and the initial-level approximation signal is found. This difference is divided into two sub-fragments with equal lengths; for a two-dimensional block, the difference is divided into four equal sub-blocks—two in horizontal and two in vertical directions. Then each of the new fragments is processed in a similar way as the initial fragment, and the pre-selected spectrum coefficients are calculated. The values of these new coefficients build the next "first" level of the inverse pyramid. Then the differences for each sub-fragment are calculated, using the corresponding approximations. These differences are divided again, this time into four equal sub-fragments (16 sub-fragments for a two-dimensional signal) and similar operations are performed to obtain the next pyramid level. The transforms of the sub-fragments in the last pyramid level should not be truncated, since they must contain the full set of spectrum coefficients. The calculated coefficients of all approximating sub-fragments (or sub-blocks) from all levels of the inverse pyramid ensure the lossless restoration of every input fragment (block) using the inverse complex orthogonal transform and the addition of all the decomposition component values.

At the end of the processing, the restored fragment should be treated with inverse normalization. The elements of one watermark are inserted sequentially in selected complex spectrum coefficients from the same pyramid level for all fragments. The watermarking in a preferred embodiment is performed as follows. Each coefficient is presented as a vector with a module and a phase, located in the complex space of the numbers. Then suitable coefficients are selected (a coefficient is suitable if its module is bigger than the adaptive threshold). This threshold is calculated as a pre-settled part of the greatest coefficient module (for the processed fragment/sub-fragment transform only). The minimum threshold must be higher than a settled positive value. Then the phases of the selected complex coefficients are modified. For this, the watermark elements are added to the phases of the complex elements. The watermark elements should already be rearranged as a pseudo-random sequence. For this rearrangement, a known public or secret key may be used. After the rearrangement, the watermark data may be transformed in such a way that the new values of its elements may be placed in a gap of several degrees. These limitations ensure the practical transparency (inaudibility) of the embedded watermark, and together with this the watermark is highly resistant against noises in the communication channel and against the basic kinds of pirates' attacks aimed at erasing the watermark. The rearrangement of the watermark elements should preferably satisfy the requirements to obtain a pseudo-random sequence, with an autocorrelation function whose shape is that of a single delta-pulse. The satisfaction of this requirement ensures the exact watermark detection and extraction from the watermarked signal.

It may be seen that using a method according to the present invention, every fragment of the input signal could receive different embedded elements of different watermarks. For example, the watermarks embedded in the "zero" level can carry information about the author of the multimedia contents, the watermarks in the second level can carry information about the licensed distributor, and the watermarks in the third level can carry information about the licensed redistributors. The embedded multi-layer watermarks do not interact and can be extracted independently. The watermarks in the different levels are preferably encrypted using different public or secret keys.

In order to extract a watermark from the tested watermarked media signal, the original signal is also needed for the processing. In accordance with the preferred embodiments, every segment of the watermarked signal is normalized and processed with the complex truncated Hadamard transform. From the calculated full set of low-frequency spectrum coefficients are selected only those that are complex numbers and satisfy the requirement that their modules be higher than the adaptive threshold, settled for the processed fragment. Together with the processing of the watermarked signal, in a similar way the fragments of the original signal are processed, synchronized with the tested one in advance. In the next step of the processing the difference between the phases of the corresponding selected coefficients is calculated, obtained in the same level of the inverse pyramids for the pair of fragments from the original and the tested signal. The calculated phase differences are inverse transformed in order to restore their initial values. The watermark elements from the consecutive fragments are accumulated, and for the restoration of the initial watermark they are rearranged with inverse permutations using the corresponding secret or public key.

In order to detect a watermark in watermarked media signals, the original watermarks are needed for the processing. Every fragment of the tested signal is normalized in the already explained way, and is processed with the complex truncated Hadamard transform. Then the suitable low-frequency coefficients (which are complex numbers with module above the adaptive threshold for the processed fragment) are selected. The known watermark data is then processed together with the tested watermarked signal. The known public key is used for this purpose. The phases of the coefficients of the fragments in the corresponding pyramid level are correlated with the watermark data from the same level, using a crawling window, which comprises a set of consecutive fragments. The sequence of numbers obtained as a result is compared with a preset threshold, which is used to detect a correlation peak higher than this threshold. In the case when this condition is answered, the detection of the searched watermark is proven.

In one aspect of the present invention, there is a method for applying a digital watermark to a signal, comprising the steps of dividing the signal into a plurality of fragments; performing an inverse difference pyramid decomposition with respect to the fragments, resulting in a plurality of pyramid levels each comprising a set of spectrum coefficients; modifying at least a subset of the spectrum coefficients with a watermark, resulting in a set of watermarked spectrum coefficients; and constructing from the watermarked spectrum coefficients a watermarked signal.

In another aspect of the present invention, there is a method of watermarking a signal, comprising the steps of dividing the signal into fragments; performing a truncated complex orthogonal transform with respect to each fragment, resulting in an approximation of the signal comprising a set of zero-level spectrum coefficients; applying a first set of watermark data to the set of zero-level spectrum coefficients; calculating the difference between the signal and the approximation of the signal with respect to each fragment; dividing the calculated difference into a plurality of sub-fragments; performing a truncated complex orthogonal transform with respect to each sub-fragment, resulting in a set of first-level spectrum coefficients; applying a second set of watermark data to the set of first-level spectrum coefficients; and performing a series of inverse complex orthogonal transforms with respect to said fragments and sub-fragments, resulting in a watermarked signal.

In another aspect of the invention, there is a method for extracting a digital watermark from a first signal utilizing a second signal, comprising the steps of dividing the first and second signals into a plurality of fragments; performing an inverse difference pyramid decomposition with respect to the fragments, resulting in a plurality of pyramid levels each comprising a set of spectrum coefficients with respect to each signal; comparing at least a subset of the spectrum coefficients from the first signal with at least a subset of the spectrum coefficients from the second signal obtaining a comparison result; and assembling a watermark from the first signal by means of inverse permutations with respect to the comparison result.

In another aspect of the invention, there is a method of extracting a watermark from a first signal utilizing a second signal not containing a watermark, comprising the steps of dividing the first signal and the second signal into fragments; performing a truncated complex orthogonal transform with respect to each fragment, resulting in an approximation of the signals comprising a set of zero-level spectrum coefficients; comparing the zero-level spectrum coefficients of the first signal to the zero-level spectrum coefficients of the second signal to extract a zero-level difference of spectrum coefficients; calculating the difference between each signal and the approximation of each signal with respect to each fragment; dividing the calculated difference into a plurality of sub-fragments; performing a truncated complex orthogonal transform with respect to each sub-fragment of each signal, resulting in a set of first-level spectrum coefficients; comparing the first-level spectrum coefficients of the first signal to the first-level spectrum coefficients of the second signal to extract a first-level difference of spectrum coefficients; and combining the zero-level difference of spectrum coefficients with the first-level difference of spectrum coefficients to result in a watermark.

In another aspect of the invention, there is a method for detecting a digital watermark in a signal, comprising the steps of dividing the signal into a plurality of fragments; performing an inverse difference pyramid decomposition with respect to the fragments of the signal, resulting in a plurality of pyramid levels comprising a set of spectrum coefficients with respect to the signal; comparing at least a subset of the spectrum coefficients with the watermark to obtain a comparison result; and comparing a detection threshold with the comparison result to determine if the watermark is found in the signal.

In another aspect of the invention, there is a method of detecting a watermark in a signal, comprising the steps of dividing the signal into fragments; performing a truncated complex orthogonal transform with respect to each signal fragment, resulting in an approximation of the signal comprising a set of zero-level spectrum coefficients; comparing the zero-level spectrum coefficients of the signal to a corresponding watermark element to generate a zero-level watermark result; calculating the difference between each signal and the approximation of each signal with respect to each fragment; dividing the calculated difference into a plurality of sub-fragments; performing a truncated complex orthogonal transform with respect to each sub-fragment of the signal, resulting in a set of first-level spectrum coefficients; comparing the first-level spectrum coefficients of the signal to a corresponding watermark element to generate a first-level watermark result; and comparing a detection threshold with a construction based on the zero-level watermark result and first-level watermark result to determine if the watermark is found in the signal.

In another aspect of the invention, there is an apparatus for applying a watermark to a signal, comprising a transform module operable to receive a segment of the signal and return a set of spectrum coefficients; a permutation module operable to receive a watermark and a key and return an encoded watermark; a watermarking module operable to receive the set of spectrum coefficients from said transform module and said encoded watermark from said permutation module and return a transformed watermarked signal comprising a set of modified spectrum coefficients; and an output module operable to add together the components of the inverse pyramid decomposition and the unchanged part of the signal and return a watermarked signal.

In another aspect of the invention, there is an apparatus for extracting a watermark from a first signal utilizing a second signal, comprising a first transform module operable to receive the first signal and return a first set of spectrum coefficients; a second transform module operable to receive the second signal and return a second set of spectrum coefficients; a comparator module operable to calculate a difference between at least a first subset of the first set of spectrum coefficients with at least a second subset of the second set of spectrum coefficients and return a transformed encoded watermark; and an inverse transform module operable to receive a key and the transformed encoded watermark and return the watermark.

In another aspect of the invention, there is an apparatus for detecting a watermark in a signal, comprising a transform module operable to receive a segment of the signal and return a set of spectrum coefficients; a permutation module operable to receive a watermark and a key and return an encoded watermark; a correlation module operable to determine a watermark correlation factor between the set of spectrum coefficients and the encoded watermark; and a comparator module operable to compare the watermark correlation factor to a watermark threshold, and return a watermark detection result.

The present invention offers a number of advantages over prior digital watermarking methods and systems. First, the present invention allows for multi-layer digital watermarking due to the use of the Inverse Difference Pyramid. The watermarks, which are inserted in the different pyramid levels, do not interact, and in fact may be extracted independently using the original media signals. The watermarks could be encrypted with a public or secret key, as desired in a particular embodiment.

In addition, another advantage of the present invention is the ability to identify watermarks, embedded in different pyramid levels, using their originals only. The original media signal is not needed.

Another advantage of the present invention is the high resistance of the embedded watermarks against noises in the communication channel, and against the basic pirates' attacks aimed at erasing watermarks. This quality is the result of the fact that the phase approach used for the watermarking is more resistant to noises in the communication channel, which influences the amplitudes of the signal elements.

Still another advantage of the present invention is the high perceptual transparency of the watermarks, due to the fact that the watermarking is performed preferably by changing the phases of the selected low-frequency spectrum coefficients with several degrees only.

Yet another advantage of the present invention is the high information capacity of the embedded watermarks, due to the watermark transparency and to the ability to insert a different watermark in every pyramid level for every fragment.

Yet another advantage of the present invention is the low computational complexity of the watermarking algorithm, due to the fact that the new pyramidal decomposition does not require interpolations and decimations, and because it is preferably based on the complex Hadamard transform with a matrix, where only one-fourth of the coefficients are complex numbers.

These and other features, objects and advantages of the present invention will become better understood from a consideration of the following detailed description of the preferred embodiments and appended claims in conjunction with the drawings as described following:

DRAWINGS

DETAILED DESCRIPTION OF PREFERRED EMBODIMENTS

Figure 1:
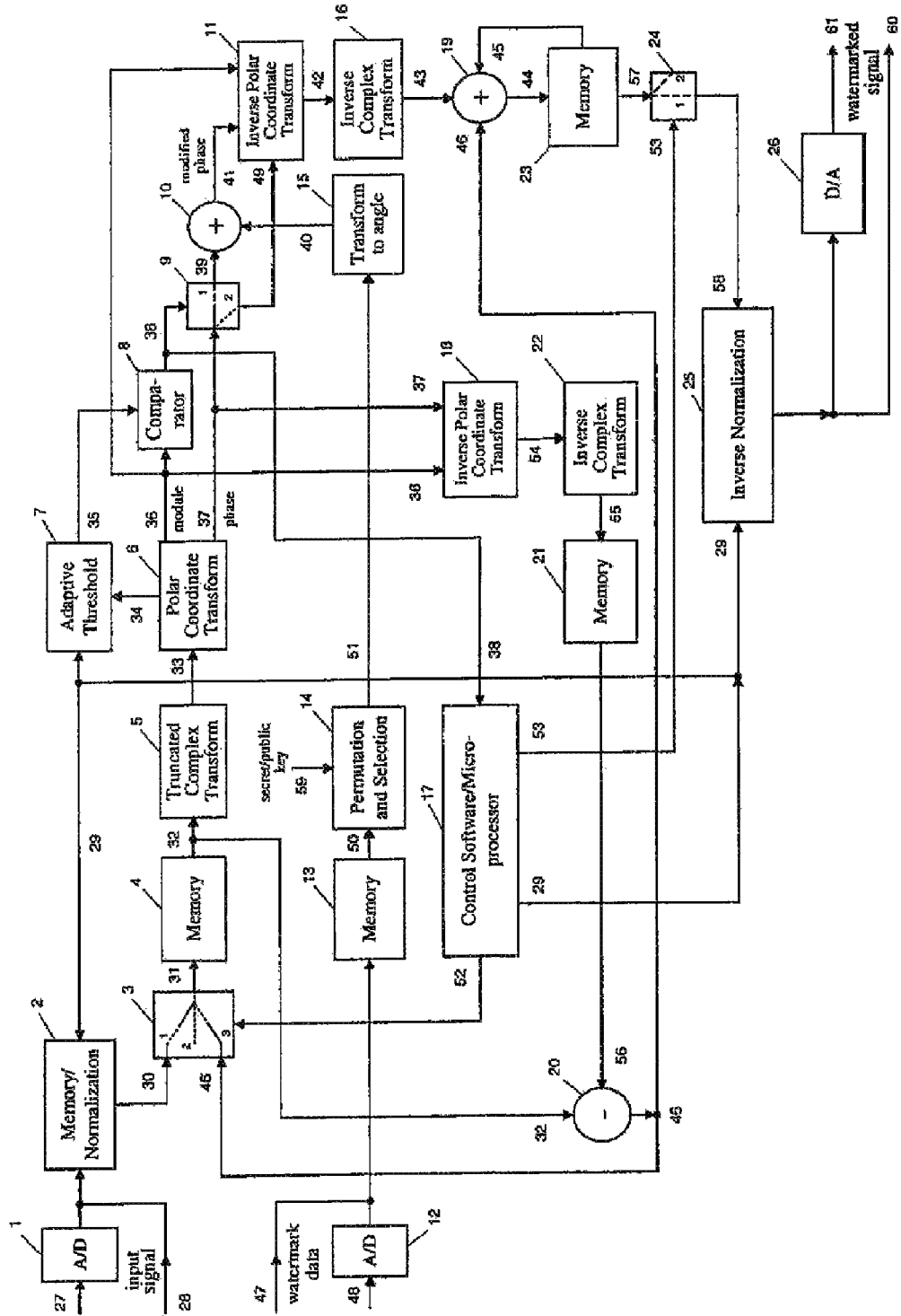
FIG. 1 is a block diagram of the encoder sub-system according to a preferred embodiment of the present invention.

The preferred embodiment of the apparatus for digital watermarking of media signals in accordance with the invention is shown in FIG. 1, which is the block diagram of the coder element. It consists of: analog-to-digital (AD) converters, a digital-to-analog (DA) converter, two-way and three-way switches, memories, block for the input fragment data, a block for amplitude normalization of the fragment, block for inverse amplitude normalization, a block for the definition of the truncated complex orthogonal transform coefficients, a block for polar coordinate transform, blocks for inverse polar coordinates transform, blocks for inverse complex orthogonal transform, summators, a block for adaptive threshold calculation, a comparator, a block for permutations and selection of the watermark elements and for their transformation into corresponding angles, and a microprocessor block with control software. Various aspects of these blocks may be implemented in different embodiments in software or hardware, or various combinations of the two, as known in the art.

In accordance with the block diagram from FIG. 1, the source of the analog media signal (which may, for example, be audio, video or image) is connected with input 27 of the first AD converter 1. Output 28 of the converter is connected with the digital media signal source and with the input of the memory included in the block for amplitude normalization 2. The second input 29 of the block for amplitude normalization is connected with the microprocessor block 17, with the block for calculation of the adaptive threshold 7, and with the block for inverse normalization 25. The output 30 of the block for amplitude normalization 2 is connected with the first input of the three-way switch 3. The second input of the switch 3 is its neutral position (free), and the third one is connected with the output 46 of the first summator 20. The output 31 of the switch 3 is connected with the first memory 4, whose output 32 is connected with the first input of the summator 20, and with the input of the block for truncated complex orthogonal transform 5. The output 33 of block 5 is connected with the input of the block for polar coordinate transform 6. The second (subtracting) input of the summator 20 is connected with the output 56 of the second memory 21, whose input 55 is connected with the output of the first block for inverse complex orthogonal transform 22. Its input 54 is connected with the output of the first block for inverse polar coordinate transform 18. The inputs 36 and 37 of the block 18 are connected with the corresponding outputs of the block for polar coordinates transform 6, whose third output 34 is connected with block 7 for adaptive threshold calculation. The output 35 of the block 7 is connected with the first input of the comparator 8, whose second input is connected with the output 36 of the block 6. The output 38 of the comparator 8 is connected with the control input of the two-way switch 9, and with the microprocessor block 17. The input of the switch 9 is connected with the output 37 of the block 6. In the case, when the switch is in position 1, its input is connected with its output 39, but when it is in position 2, the data is transferred to the input 49 of the block for polar coordinates transform 11. The output 39 of the switch is connected with the first input of the second summator 10, whose second input 40 is connected with the output of the block for transformation into angle 15, and the output 41 of the summator 10 is connected with the first input of the second block for inverse polar coordinates transform 11, whose second input is connected with the output 36 of the block 6. The output 42 of block 11 is connected with the input of the second block for inverse complex orthogonal transform 16. The output 43 of block 16 is connected with the first input of the third summator 19, whose second input is connected with the output 46 of the first summator 20. The third input of the summator 19 is connected with the first output 45 of the third memory 23. Its input 44 is connected with the output of the third summator 19. The second output 57 of the memory 23 is connected with the input of the second two-way switch 24, whose control input 53 is connected with the corresponding input of the microprocessor block 17. The control output 52 of the block 17 is connected with the control inputs of the switch 3. The source of the analog watermark signal is connected with input 48 of the second AD converter 12, whose output 47 is connected with the source of the digital watermark signal and with the input of the fourth memory 13. The output 50 of the memory 13 is connected with the first input of block 14 for data permutations and for watermark elements selection. The second input 59 of block 14 is connected with the source of the code, representing respectively the secret or public key for watermark data encryption. Such key systems are known in the art. Output 51 of block 14 is connected with the input of block 15 for data transformation into an angle. In the case, when switch 24 is in position 1, its input and output are connected, but when the switch is in position 2, this connection is cut. Output 58 of switch 24 is connected with the input of the block for inverse amplitude normalization 25, whose output 60 is the output of the coder for digital watermarked media signal. This output is connected with the input of DA converter 26, whose output 61 is the output of the coder for analog watermarked media signal.

The operation of the coder, in accordance with the preferred embodiment of the present invention, may proceed as follows. The input analog media signal is applied at the input of AD converter 1. The elements obtained at the output of the AD converter digital signal (which could be input directly as well) are saved sequentially in the memory of block 2. This memory should preferably be big enough to contain the whole selected fragment ($2^n$ samples for one-dimensional signal, or $2^n \times 2^n$ samples for two-dimensional one). In block 2 the amplitude normalization of the fragment is performed. This is done only in the case when the maximum amplitude of the processed fragment elements is smaller than the maximum possible one. The normalization is performed by multiplying the amplitudes of all the elements with a coefficient, equal to the ratio, obtained after the division of the maximum possible amplitude with that of the largest element in the processed fragment. The normalized data passes switch 3, which is in position 1, and is stored in memory 4, which preferably has a capacity equal with that of the memory in block 2. The stored data is then transferred from memory block 4 into block 5, where it is processed by means of the truncated complex orthogonal transform. In particular, the direct and inverse complex Hadamard transforms (CHT) for the one-dimensional (audio) signal x(k) are defined as follows:

$$y(u) = \sum_{k=0}^{N-1} x(k) t(u, k)$$
$$= y_r(u) + j y_{Im}(u)$$

for $u = 0, 1, \ldots, N - 1 (N = 2^n)$, $$x(k) = \frac{1}{N} \sum_{u=0}^{N-1} y(u) t^*(u, k)$$

for $k = 0, 1, \ldots, N - 1$, where $j = \sqrt{-1}$, $y_r(u)$ and $y_{Im}(u)$ are correspondingly the real and the imaginary part of the complex coefficient $y(u)$; $t(u,k)$ is the element $(u,k)$ of the matrix for the direct CHT, and $t^*(u,k)$ is an element of the matrix for the inverse CHT, which is complex-conjugated with $t(u,k)$.

The elements of the matrices for the direct and the inverse CHT are defined by:

$$t(u,k) = j^{-uk} h(u,k); \quad t^*(u,k) = j^{uk} h(u,k)$$

where the function h(u,k) is respectively $$h(u, k) = \begin{cases} 1 & \text{for } n = 2; \\ \prod_{r=3}^{n} (-1)^{\lfloor \frac{u}{2^{r-1}} \rfloor \lfloor \frac{k}{2^{r-1}} \rfloor} & \text{for } n = 3, 4, \ldots, \end{cases}$$

and $n = \lg_2 N$, and $\lfloor a/b \rfloor$ is the operator for the extraction of the integer part of the result obtained from the division of the numbers a and b.

For example, by taking N=8 one may obtain the matrix for the direct CHT, as follows:

$$[t(u, k)] = \begin{bmatrix} 1 & 1 & 1 & 1 & 1 & 1 & 1 & 1 \\ 1 & -j & -1 & j & 1 & -j & -1 & j \\ 1 & -1 & 1 & -1 & 1 & -1 & 1 & -1 \\ 1 & j & -1 & -j & 1 & j & -1 & -j \\ 1 & 1 & 1 & 1 & -1 & -1 & -1 & -1 \\ 1 & -j & -1 & j & -1 & j & 1 & -j \\ 1 & -1 & 1 & -1 & -1 & 1 & -1 & 1 \\ 1 & j & -1 & -j & -1 & -j & 1 & j \end{bmatrix}$$

The direct and the inverse two-dimensional CHT for a two-dimensional signal (for example, a digital image) with elements x(i,k) and dimensions N×N(N=2 n), are defined with the following equations:

$$y(u, v) = \sum_{i=0}^{N-1} \sum_{k=0}^{N-1} x(i, k) j^{-(ui+vk)} h(u, i) h(v, k)$$

for $u = 0, 1, \ldots, N - 1, v = 0, 1, \ldots, N - 1$;

$$x(i, k) = \frac{1}{N^2} \sum_{i=0}^{N-1} \sum_{k=0}^{N-1} y(u, v) j^{(ui+vk)} h(u, i) h(v, k)$$

for $i = 0, 1, \ldots, N - 1, k = 0, 1, \ldots, N - 1$, where the sign functions h(u,i) and h(v,k) are calculated in correspondence with the equation provided above, and $j^{-(ui+vk)} h(u,i) h(v,k)$ and $j^{(ui+vk)} h(u,i) h(v,k)$ are the kernels correspondingly of the direct and of the inverse two-dimensional CHT.

In block 6 each coefficient y(u) from the truncated transform is transformed from the orthogonal into polar coordinates system in correspondence with the equation:

$y(u) = M(u) \exp[j\phi(u)]$ where M(u) and $\phi(u)$ are the module and the phase of the coefficient, defined with the equation:

$$M(u) = \sqrt{[y_{Im}(u)]^2 + [y_r(u)]^2}, \quad \varphi(u) = \text{arctg}[y_{Im}(u) / y_r(u)].$$

The real and the imaginary part of y(u) are connected with its module and phase through the relations for the transformation of the polar coordinates in orthogonal:

$y_r(u) = M(u) \cos \phi(u), y_{Im}(u) = M(u) \sin \phi(u)$.

For a two-dimensional CHT the direct and the inverse transforms of the spectrum coefficients y(u,v) from orthogonal into polar coordinates are performed in accordance with the equations presented above.

In block 7 the value of the adaptive threshold η is calculated, which is used for the selection of the coefficients suitable for watermarking in the processed pyramid level for the selected fragment. The threshold η should be a part α<1 of the module $M_{max}$ of the largest coefficient (or a group of coefficients) in the processed fragment transform. The minimum value of η is limited with the requirement to be larger than some predefined small positive value δ, i.e.:

$$\eta = \begin{cases} \alpha M_{max} & \text{if } \alpha M_{max} > \delta, \\ \delta - & \text{in other cases.} \end{cases}$$

The phase watermarking of the spectrum coefficients, selected using the adaptive threshold η, is performed with the comparator 8, the switch 9 and the summator 10. These blocks perform the following operation:

If $|M(u)|>\eta$, then $\phi_w(u)=\phi(u)+w(u)$ and $\phi_w^*(u)=\phi(u)-w(u)=-\phi_w(u)$, where $\phi(u)$, $\phi^*(u)$ and $\phi_w(u)$, $\phi^*w(u)$ are respectively the phases of the complex-conjugated couples of coefficients y(u) and y*(u) before and after the watermarking, and w(u) is one element of the corresponding sequence, which describes the inserted watermark in the selected pyramid level. In accordance with this equation, the phase watermarking of the spectrum coefficients is performed, obtained with two-dimensional CHT as already set forth and applied on every block of the image, with size N×N pixels.

The sequence w(u) is obtained in block 14, performing pseudo-random permutation of the watermark data, where the initial settings are set with the code of the public or secret key, used for the watermark encryption. The encrypted watermark data is transferred to the block 15, where it is transformed in such a way that all the values are placed in the gap of several degrees only. In the case that all of these requirements are answered, the changes of the phases of the selected coefficients are practically inaudible/invisible, as applicable to the chosen form of signal. The permutations of the watermark elements in block 14 should answer the requirement of the preferred embodiment for obtaining a pseudo-random sequence w(u), whose auto-correlation function has the shape of a single delta pulse. This ensures exact watermark detection and extraction. The data elements of the selected digital watermark prior to the permutations in block 14 are saved in memory 13. In the case that the watermark is an analog signal, it is transformed in digital form with the AD converter 12, and after that it is stored in the memory 13. In correspondence with the equation set forth above, at block 11 an inverse polar coordinate transform of the module and the phase of every spectrum coefficient is performed, which can be the non-marked y(u), in correspondence with the equation already presented, or the marked $y_w(u)$, defined as:

$$y_w(u)=M(u)\exp[j\phi_w(u)]=M(u)\exp\{j[\phi(u)+w(u)]\}.$$

The inverse polar coordinate transform for every watermarked coefficient is defined as:

$$y_w(u)=y_{rw}(u)+jy_{Imw}(u)=M(u)\cos\phi_w(u)+jM(u)\sin\phi_w(u).$$

In the block 16 all the coefficients (watermarked and non-watermarked) are processed with inverse CHT in accordance with the equation already presented. The result obtained is the corresponding component from the pyramid level of the processed fragment.

For the pyramid level p=0 at the output of block 16 the corresponding watermarked component is obtained:

$$\tilde{x}_{w0}(k) = \frac{1}{2^n}\left[\sum_u y_{w0}(u)t^*(u,k) + \sum_u y_0(u)t^*(u,k)\right]$$

for $k = 0, 1, \ldots, 2^n - 1$, where $y_{w0}(u)$ and $y_0(u)$ are respectively the watermarked and non-watermarked coefficients in the truncated transform of the input fragment x(k), calculated with CHT in accordance with the equation first presented above. Prior to the inverse CHT described here, all of the missing coefficients of the truncated transform are substituted with zero values, in order to restore the transform with its full length, $2^n$.

For every consecutive level p=1, 2, 3, ..., n-1, the component obtained at the output of block 16 is:

$$\tilde{e}_{w,p-1}^{s_p}(k) = \frac{1}{2^{n-p}}\left[\sum_u y_{wp}^{s_p}(u)t^*(u,k) + \sum_u y_p^{s_p}(u)t^*(u,k)\right]$$

for $s_p = 1, 2, \ldots, 2^p$ and $k = 0, 1, \ldots, 2^{n-p} - 1$, where $s_p$ is the number of the sub-fragment, with length $2^{n-p}$ elements in the pyramid level p. Here $y_{wp}^{s_p}(u)$ and $y_p^{s_p}(u)$ are respectively the watermarked and non-watermarked truncated coefficients supplemented with zero-values up to the $2^{n-p}$ transform $e_{p-1}^{s_p}(k)$ of the difference sub fragment $s_p$. On the other hand, this sub-fragment is calculated in the summator 20 in accordance with the relations:

$$e_{p-1}^{s_p}(k) = \begin{cases} x(k) - \tilde{x}_0(k) & \text{for } p = 0, \\ e_{p-2}^{s_{p-1}}(k) - \tilde{e}_{p-2}^{s_{p-1}}(k) & \text{for } p = 2, 3, \ldots, n-1, \end{cases}$$

$k = 0, 1, \ldots, 2^{n-p} - 1.$

The second component in every difference is calculated with inverse CHT of the truncated and supplemented with zero-values transform, consisting of non-watermarked coefficients only, which is transformed in orthogonal coordinates, i.e.:

$$\tilde{x}_0(k) = \frac{1}{2^n}\sum_u y_0(u)t^*(u,k),$$

$$\tilde{e}_{p-2}^{s_{p-1}}(k) = \frac{1}{2^{n-p+2}}\sum_u y_{p-2}^{s_{p-2}}(u)t^*(u,k).$$

The inverse polar and CHT transforms are performed in blocks 18 and 22 respectively. The components, obtained in accordance with the equation (17) are stored in the memory 21. From the output of the summator 20 the components $e_{p-1}^{s_p}(k)$ for $s_p=1, 2, \ldots, 2^p$ pass through the switch 3, which is in position 3, and after that they are stored in the memory 4. In the next cycle, corresponding with the pyramid level p+1, the component $e_{p-1}^{s_p}(k)$ (which is stored in the memory 4) is divided into two sub-fragments with length $2^{n-p+1}$. Then each sub-fragment is processed with truncated CHT and the subsequent steps already described, similar with the processing of the input fragment x(k) with length $2^n$ in the initial pyramid level p=0.

When the last level p=n is reached, the switch 3 is set in position 2 (open). Then the residual component $e_{n-1}(k)$ from the output of block 20 is transferred without watermarking directly to the input of the summator 19. In this way memory 23 accumulates all of the components of the pyramidal decomposition. The multi-layer watermarked signal $x_w(k)$ with (n+1) levels is obtained at the output of the switch 24, which is in position 1, and may be described as:

$$x_w(k) = \tilde{x}_{w0}(k) + \sum_{p=1}^{n-1} \tilde{e}_{w,p-1}^{s_p}(k) + e_{n-1}(k)$$

for $k = 0, 1, \ldots, 2^n - 1$ and $s_p = 1, 2, \ldots, 2^p$.

In this expression the component $e_{n-1}(k)$ is defined in a similar way as $e_{p-1}^{s_p}(k)$. The selected elements of n different watermarks could be embedded in the pyramid levels p=0, 1, 2, . . . , n−1 for every fragment. The embedding should start from the pyramid level zero, i.e., p=0.

The elements $x_w(k)$ of the watermarked signal are normalized back (with inverse amplitude normalization) in the block 25, controlled by the microprocessor block 17. For this purpose every element $x_w(k)$ is divided with the coefficient, calculated for the processed fragment in the block for amplitude normalization 2. The elements of the restored signal are obtained at the output 60 of the decoder. In the case when the watermarked signal should be analog, it is transformed with the DA converter 26 and is obtained at the output 61. When the next fragment of the original signal is inputted in the coder, its elements are stored and normalized in block 2, switch 3 being in position 1 and the already described multi-layer watermarking is performed again.

The performance of the coder in accordance with FIG. 1 could be generalized for two-dimensional signals (images) as well, introducing a second variable and using two-dimensional CHT. Each fragment (sub-fragment) would in this embodiment be a two-dimensional block with size $2^n \times 2^n$, respectively $2^{n-p} \times 2^{n-p}$—for a sub-block in the level p.

Figure 2:
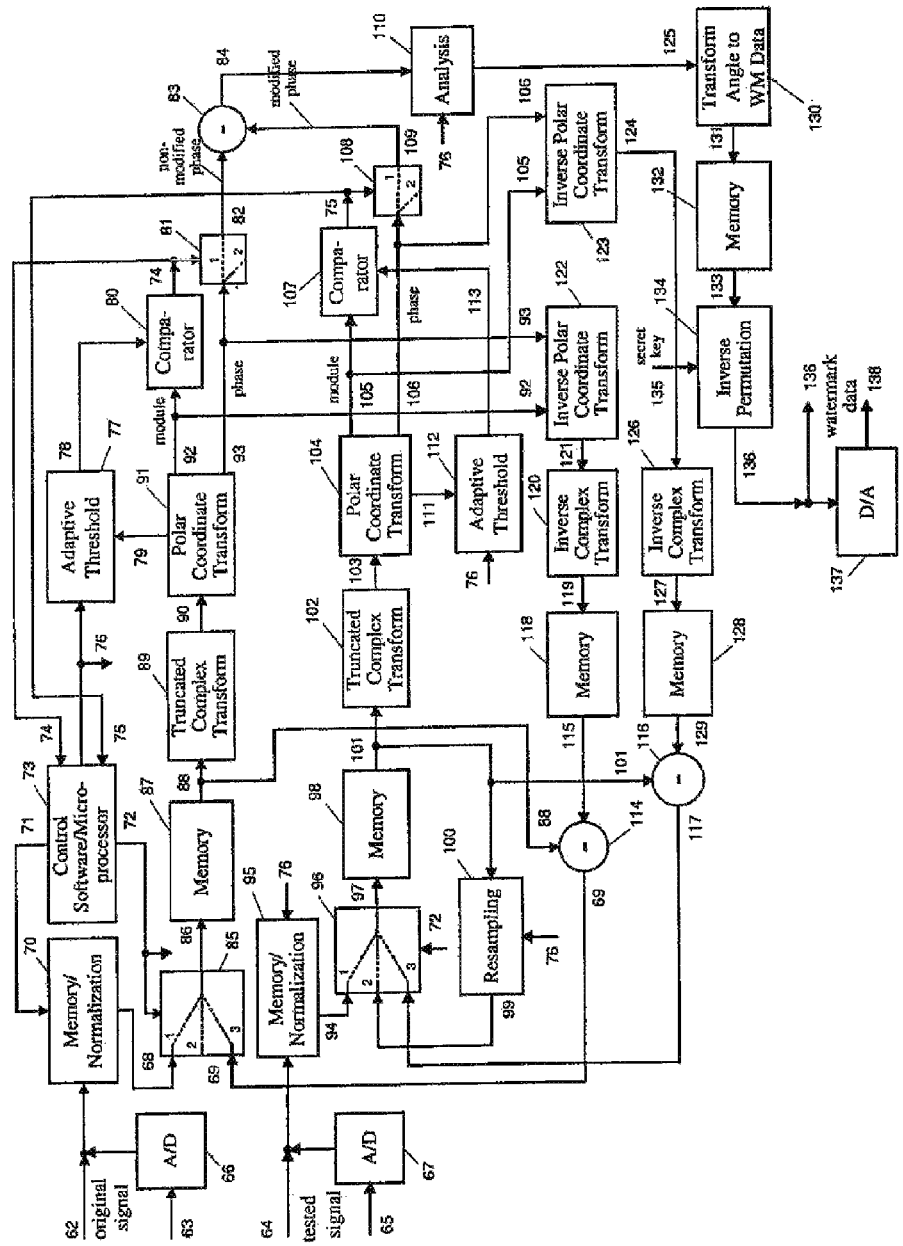
FIG. 2 is a block diagram of the decoder sub-system according to a preferred embodiment of the present invention.

Referring now to FIG. 2, a decoder according to a preferred embodiment of the present invention may now be described. It consists of: AD converters, a DA converter, two- and three-way switches, memories, block for storing the input fragment and for fragment amplitude normalization, comparators, blocks for truncated direct and inverse complex orthogonal transforms, blocks for polar coordinate transform (direct and inverse), summators, blocks for adaptive threshold calculation, blocks for re-sampling, blocks for analysis and for phase angle transformation in the watermark element, a block for inverse permutations and watermark decryption with a public or secret key, and a microprocessor block with control software. Again, any of these elements could be implemented in software or hardware or any combination, as known in the art. In accordance with the block diagram shown in FIG. 2, the source of the analog media signal (audio, video or still image) is connected with input 63 of first AD converter 66. Its output 62 is connected with the source of the original digital signal and with the input of the first memory, included in the block for normalization 70. The second control input of block 70 is connected with output 71 of the microprocessor block with control software 73. Output 68 of the block for amplitude normalization 70 is connected with the first input of the first three-way switch 85. The second input of switch 85 is its neutral position (free), and its third input is connected with output 69 of first summator 114. Output 86 of switch 85 is connected with first memory 87, whose output 88 is connected with the input of the first block for truncated complex orthogonal transform 89 and with the first input of summator 114. Output 90 of block 89 is connected with the input of the first block for polar coordinates transform 91. Its first output 79 is connected with the first input of the block for adaptive threshold calculation 77, whose second control input 76 is connected with the microprocessor block 73. The second (subtracting) input of summator 114 is connected with output 115 of second memory 118, whose input 119 is connected with the output of the first block for inverse orthogonal transform 120. Input 121 of block 120 is connected with the output of the first block for inverse polar coordinates transform 122. The inputs 92 and 93 of the first block for inverse polar coordinates transform 122 are connected with the corresponding outputs of the block for polar coordinate transform 91. Output 78 of block 77 for adaptive threshold calculation is connected with the first input of first comparator 80, whose second input is connected with output 92 of the block 91. Output 74 of comparator 80 is connected with the input of the microprocessor block and with the control input of first two-way switch 81. The input of two-way switch 81 is connected with output 93 of block 91. In the case that switch 81 is in position 1, its input and output are connected, but when it is in position 2, this connection is cut. Output 82 of switch 81 is connected with the first input of second summator 83, whose second (subtracting) input 109 is connected with the output of the second two-way switch 108, and output 84 of summator 83 is connected with the first input of the block for analysis 110. The second input of the block for analysis is connected with output 76 of the microprocessor block 73, and output 125 of the block for analysis 110 is connected with the input of block 130 for the transformation of the phase angle back into watermark data. The source of the tested analog signal (audio, video or image) is connected with input 65 of the second AD converter 67. Output 64 of the converter is connected with the source of the tested digital signal and with the first input of the second memory, included in the block for amplitude normalization 95. The second (control) input of block 95 is connected with the output 76 of microprocessor block 73. Output 94 of the second block for amplitude normalization 95 is connected with the first input of second three-way switch 96. The second input of block 96 is connected with output 99 of the block for re-sampling 100, and the third input of block 96 is connected with the output 117 of third summator 116. The control inputs of switches 85 and 96 are connected with output 72 of microprocessor block 73. Output 97 of switch 96 is connected with the input of third memory 98, whose output 101 is connected with the input of the second block for truncated complex orthogonal transform 102, with the first input of third summator 116, and with the input of the block for re-sampling 100. Output 103 of block 102 is connected with the input of the second block for polar coordinates transform 104. The second input of the block for re-sampling 100 is connected with output 76 of microprocessor block 73. The second (subtracting) input of third summator 116 is connected with output 129 of fourth memory 128, whose input 127 is connected with the output of the second block for inverse complex orthogonal transform 126. Input 124 of block 126 is connected with the output of the second block for inverse polar coordinates transform 123. Inputs 105 and 106 of block 123 are connected with the corresponding outputs of the second block for polar coordinates transform 104, whose third output 111 is connected with the input of the second block for adaptive threshold calculation 112. The second input of block 112 is connected with output 76 of the microprocessor block. Output 113 of block 112 is connected with the first input of comparator 107, whose second input is connected with output 105 of block 104. Output 75 of comparator 107 is connected with microprocessor block 73 and with the control input of second two-way switch 108, whose input is connected with output 106 of block 104. In the case when switch 108 is in position 1, its input is connected with its output 109, and when it is in position 2, this connection is cut. The output 131 of block 130 for transformation of the angle to watermark data is connected with the input of fifth memory 132, whose output 133 is connected with the input of block 134 for inverse watermark data permutations. The second input 135 of block 134 is connected with the source of the secret or public key digital code. Output 136 of block 134 is the output of the decoder for the digital signal, consisting of the extracted digital watermark data. Output 136 of block 134 is connected with the input of DA converter 137, whose output 138 is the output of the decoder for the analog signal, consisting of the extracted watermark data.

The performance of the decoder, in accordance with the preferred embodiment of the present invention and following FIG. 2, is as follows. The tested analog signal is applied at input 65 of AD converter 67, and in the case that the input signal is digital, it is applied at input 64. For the watermark data extraction from every fragment of the input signal, the fragment elements are stored and normalized in block 95 in the way already described with respect to block 2 of FIG. 1 in the coder portion of the description of the preferred embodiment of the present invention. The normalized elements of the processed fragment pass through switch 96, which is in position 1, and are saved in memory 98. After this they are processed in block 102 for truncated complex orthogonal transform, in accordance with the equations presented above in connection with the coder. The obtained low-frequency coefficients $y_p(u)$ from the level p are transformed in block 104 into polar coordinates, again using the equations as given above. Using switch 108, controlled by comparator 107, from these coefficients only those with modules higher than the threshold $\eta_p$ for level p, defined in block 112, are selected. Together with the processing of the watermarked signal, in a similar way in blocks 66, 70, 85, 87, 89, 91, 77, 80 and 81 the fragments of the original signal are processed, which had already been synchronized with the tested one. For every pair of fragments from the watermarked and the original signals, the differences between the corresponding couples of coefficients $y_{wp}{}^{s_p}(u)$ and $y_p{}^{s_p}(u)$ are calculated with the summator 83, from the sub-fragments $s_p$, i.e., $$w_{s_p}(u) = \phi_{w s_p}(u) - \phi_{s_p}(u) \text{ if } |M_{s_p}(u)| > \eta_{s_p} \text{ for}$$
$$s_p = 1, 2, \ldots, 2^p \text{ and } p = 1, 2, \ldots, n-1.$$

For p=0 the sub-fragment $s_0$ is in fact the input fragment with size $N=2^n$. In the block for analysis 110 the obtained phase differences $w_{s_p}(u)$ are compared with the predefined threshold $\Delta p$ and then only those whose modules are bigger are retained:

$$w'_{s_p}(u) = \begin{cases} w_{s_p}(u) \text{ if } |w_{s_p}(u)| > \Delta_p; \\ 0 - \text{in other cases}. \end{cases} \text{ for } u = 0, 1, 2, \ldots, 2^{n-p} - 1.$$

As a result, the noise level in the extracted watermarks is reduced.

The elements $w'_{s_p}(u)$ whose values are above the threshold are stored in the memory of block 110. In the following block 125 they are transformed back from phase angles into watermark data, corresponding with the initial discrete values, embedded in the processed fragment (sub fragment) $s_p$ from the level p. For the watermark to be restored from its elements, a group of consecutive fragments (sub-fragments) are stored in memory 132. Then in block 134 those fragments are processed with inverse permutations and selection with a secret or public key. The digital watermark from every level is obtained at the output 136 of the decoder. In such case that the obtained data should be in analog form, it is obtained at the output of the DA converter, which is the output 138 of the decoder.

The connections from the outputs of blocks 104 and 91 are used for the parallel recursive processing of the transforms of the consecutive fragments (sub-fragments) for the extraction of watermarks, embedded in different pyramid levels. For this purpose in blocks 123 and 122 after an inverse polar coordinates transform for coefficients $y_{wp}{}^{s_p}(u)$ and $y_p{}^{s_p}(u)$, which are from fragment $s_p$, an inverse CHT is performed respectively in blocks 126 and 120 and the result is stored in memories 128 and 118. The differences $e_{w_{p-1}}{}^{s_p}(k)$ and $e_{p-1}{}^{s_p}(k)$ for $s_p = 1, 2, \ldots, 2^p$ are calculated in the summators 116 and 88. The obtained components pass through switches 96 and 85 (in position 3) and are stored in memories 98 and 87. Then every component is divided into two sub-fragments with size $2^{n-p+1}$, which after that are used for the recursive calculation of the next level (p+1) for the pair of fragments from the original and the tested signal. In the case that in the block for analysis 110 watermark elements for the level p are not selected, the switch 85 is set in position 2. Then the elements of the corresponding tested fragment, or a group of fragments, stored in memory 98, are input to the block for re-sampling 100. There the number of the elements is increased or reduced in predefined limits, which results in corresponding fragment length stretch or skew. The elements obtained as a result are passed through switch 85 and stored back in memory 98. Then the fragment (sub-fragment) is processed again, searching the possibly inserted watermark elements in the pyramid levels. When all the operations for all the re-sampling cycles are finished, the switch 96 is set to position 1 and into memory 96 the next normalized fragment is inserted. After that all the described operations are performed again. It may be noted that the performance of the decoder in accordance with FIG. 2 could be generalized for two-dimensional signals (images) in a similar way as this was described above for the coder.

Figure 3:
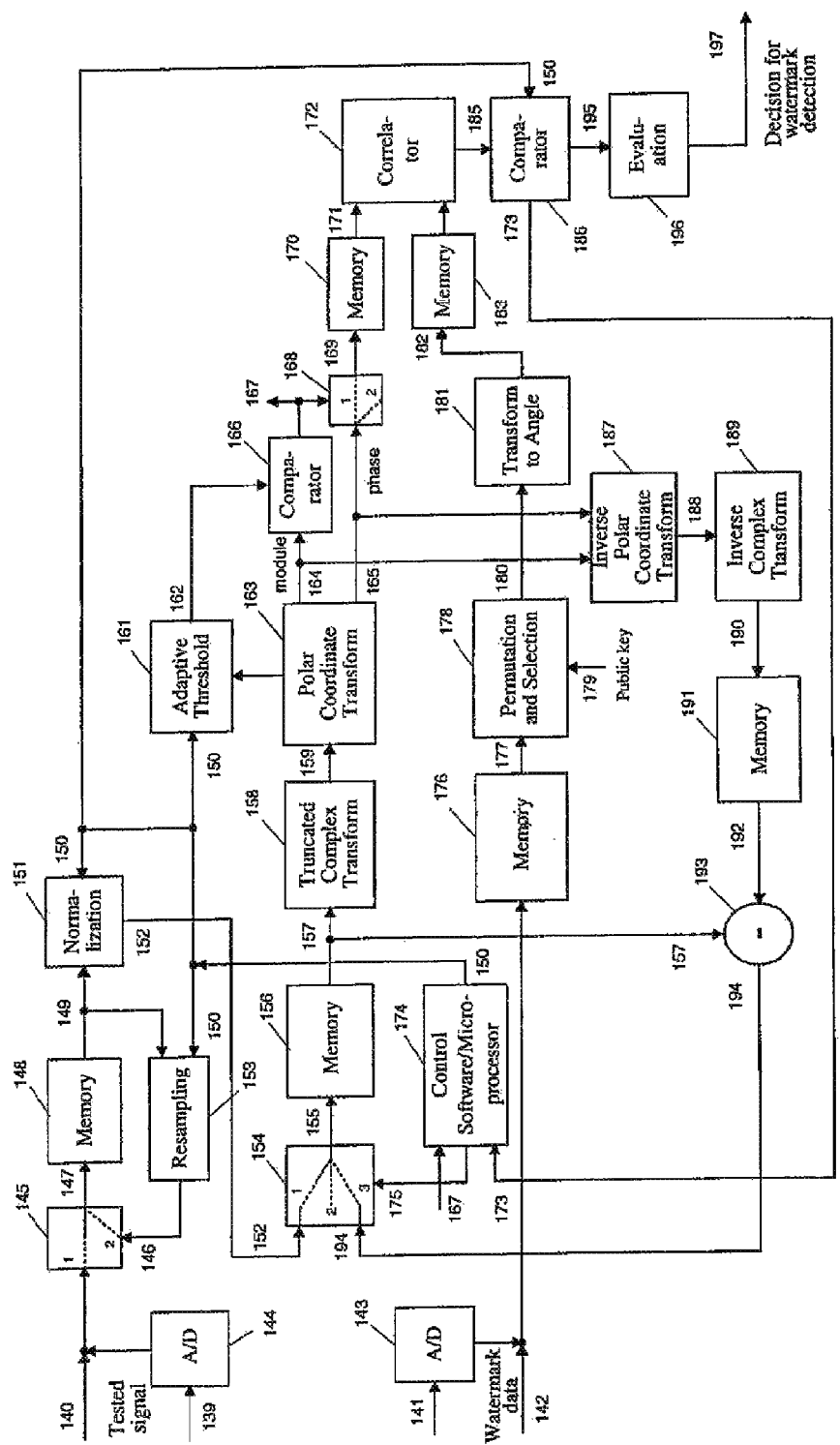
FIG. 3 is a block diagram of the detector sub-system according to a preferred embodiment of the present invention.

Turning now to FIG. 3, a detector for a preferred embodiment of the present invention may be described. Its components include AD converters, switches, memories, a block for storing a group of consecutive fragments, a block for normalization, comparators, blocks for complex orthogonal and for polar coordinates transforms, a summator, blocks for calculation of the adaptive threshold and for re-sampling, a correlator and a block for evaluation, a block for transforming the phase angle into a watermark element, a block for inverse permutations and for watermark decryption with a secret or public key, and a microprocessor block with control software. In accordance with the block diagram from FIG. 3, the source of the tested analog signal (audio, video or still image) is connected with input 139 of the first AD converter 144, whose output 140 is connected with a source of the tested digital input signal and with the first input of the two-way switch 145. The second input 146 of the two-way switch is connected with the output of the block for re-sampling 153, whose first input 150 is connected with the corresponding output of microprocessor block 174. The second input 149 of block 153 is connected with the output of first memory 148 and with the first input of the block for amplitude normalization 151. The second input of this block is connected with output 150 of microprocessor block 174. Output 147 of switch 145 is connected with the input of first memory 148, and output 152 of the block for amplitude normalization 151 is connected with the first input of three-way switch 154. The second input of switch 154 is its neutral position (free), and the third one is connected with output 194 of summator 193. The control input of switch 154 is connected with output 175 of microprocessor block 174. Output 155 of the switch is connected with the input of second memory 156, whose output 157 is connected with the input of the block for truncated complex orthogonal transform 158, and with the first input of summator 193. The second (subtracting) input 192 of summator 193 is connected with the output of third memory 191, whose input 190 is connected with the output of the block for inverse complex orthogonal transform 189. Input 188 of block 189 is connected with the output of the block for inverse polar coordinates transform 187, whose inputs 164 and 165 are connected with the corresponding outputs of the block for polar coordinates transform 163. The third output of block 163 is connected with the first input of the block for adaptive threshold calculation 161, whose second input is connected with output 150 of microprocessor block 174. Output 162 of block 161 is connected with the first input of first comparator 166, whose second input is connected with output 164 of the block for polar coordinates transform 163. The input of block 163 is connected with output 159 of the block for truncated complex orthogonal transform 158. The output 167 of comparator 166 is connected with the control input of the first two-way switch 168 and with the microprocessor block. Input 165 of switch 168 is connected with the output of block 163. In such case that switch 168 is in position 1 its input is connected with its output 169, and when the switch is in position 2, this connection is cut. Output 169 of switch 168 is connected with the input of fourth memory 170, whose output 171 is connected with the first input of correlator 172. The second input of correlator 172 is connected with the output of fifth memory 183, whose input is connected with output 182 of the block for data transformation into angle 181. The input of block 181 is connected with output 180 of the block for permutations and selection 178, whose first input 179 is connected with the source of the code for the public or secret key. The second input of block 178 is connected with output 177 of sixth memory 176, whose input 142 is connected with the output of second AD converter 143 and with the source of the digital watermark data. The tested signal is applied at inputs 139 (analog) or 140 (digital). Input 141 of second AD converter 143 is connected with the source of analog signal, representing the watermark in continuous form. Output 185 of correlator 172 is connected with the first input of second comparator 186, whose second input is connected with output 150 of microprocessor block 174. The first output 173 of comparator 186 is connected with the corresponding input of microprocessor block 174, and its second output 195 with the input of the block for evaluation 196. Output 197 of block 196 is the output of the detector for watermark identification in the tested input signal.

The performance of the detector in accordance with the invention may be described in a preferred embodiment as follows. The tested analog signal is applied at input 139 of AD converter 144; in the case that the tested signal is digital, it is applied at input 140. The original watermark signal is used for the watermark identification. In the process of identification the discrete elements of a group of consecutive fragments from the tested signal pass two-way switch 145, which is in position 1, and are stored in memory 148. In the next block 151 every fragment is normalized in the same way as was already described with respect to the coder above. The obtained data passes through switch 154, which is in position 1, and is stored in memory 156. After that it is processed by means of truncated complex Hadamard transform (CHT) in block 158 and the obtained coefficients are transformed into polar coordinates in block 163. Then the low-frequency spectrum coefficients whose modules are higher than the threshold are selected, calculated in the block 161 for the processed fragment with the comparator 166 and with the switch 168. The selected phase sequence, obtained from the group of processed fragments, is stored in memory 170. Together with the processing of the tested signal, the watermark elements are processed in blocks 143, 175, 178, 181 and 183, which should be identified in the corresponding pyramid levels for the processed fragments. For this purpose the code of the public or secret key, used for the watermark data encryption, is applied in block 178 for permutations and selection of the watermark elements. The obtained watermark data elements are transformed in block 181 into corresponding angles, and after that stored in memory 183. For the searched watermark identification in block 172, a calculation is performed using the correlation between the phases of the selected coefficients for the corresponding pyramid level p of the processed test fragments, and the watermark elements for the same level for a part of the tested signal, framed by a crawling window, spread over a group of $M_p$ consecutive fragments in correspondence with the equation:

$$\rho_p[w_{s_p}(u), w^*_{s_p}(u)] = \left\{ \frac{\sum_{u=1}^{M_p} w_{s_p}(u) w^*_{s_p}(u)}{\sqrt{\sum_{u=1}^{M_p} w^2_{s_p}(u)} \sqrt{\sum_{u=1}^{M_p} w^{*2}_{s_p}(u)}} \right\} \geq T_p$$

for
$$p = 0, 1, \ldots, n-1.$$

Here $M_p$ is the number of the fragments $s_p$ in the interval, containing the elements $w_{s_p}(u)$ and $w^*_{s_p}(u)$ respectively for that one extracted from the tested signal watermark and for the original one, applied at input 142 of the detector, and $\rho_p$ is the coefficient of the normalized cross correlation between the sequences $w_{s_p}(u)$ and $w^*_{s_p}(u)$ of the pair of fragments $s_p$. The row of correlation numbers, obtained in accordance with this equation is compared in comparator 186 with the pre-settled threshold $T_p$ for the level p, in order to find whether there is a correlation peak above this threshold. In the case that this condition is answered, in the block for evaluation it is determined whether the searched watermark is found (identified) or that the watermark is not identified in the level p of the tested media signal. At output 197 of the detector the corresponding binary signal for the watermark identification is produced. In accordance with the equation 16 in blocks 187, 189, 191 and 193 are defined the elements $e_{p-1}^{s_p}(k)$ of the difference sub-fragment $s_p$, which pass through switch 154 (in position 3) and are stored in memory 156. After that the sub-fragments from the next level (p+1) from the input fragment pyramid are calculated. In the case that at the end of the processing of the level p=n−1 there is no decision for watermark identification, the switch 145 is set in position 2 and the tested group of fragments is processed in the block for resampling 153. The corresponding signal, stretched or skewed up to some predefined limits, is sent in the block for amplitude normalization 151. After that it is processed again in the already described way and the watermark is searched in all pyramid levels of the selected group of fragments. The final decision for watermark missing in the signal, stored in memory 145, could be taken only when all re-sampling cycles are performed. The performance of the detector in accordance with FIG. 3 could be generalized for two-dimensional signals (images) in an analogous manner as described for the coder and the decoder.

The example implementation of the control software for the apparatus for digital watermarking of media signals (the coder) according to a preferred embodiment of the present invention may now be described with reference to FIG. 4. As already explained, the invention is not limited to the implementation of particular functions or features in hardware and software, it being well understood that functions and sub-elements may be implemented in either way as will be apparent to those skilled in the art. The example control software for the coder according to the preferred embodiment contains a block for the coder initial settings, a block for watermark settings and permutation control, a block for watermark elements selection and transfer control, a block for preparation and control of the watermark data transformation into angle function, a block for fragment amplitude normalization control, a block for preparing the fragment data for the processing, blocks for processing the prepared data with truncated direct and inverse complex orthogonal transforms, for direct and inverse transformation in polar coordinates, for phase modification, for calculation of the difference signal, and a block for watermarked signal restoration and inverse normalization.

The processing starts with the coder initial settings preparation in block 199. Output 201 of this block is connected with the input of block 202 for preparing the processing of the fragment data and its amplitude normalization, with the input of block 200 for setting the watermark data and starting its permutations, and with the output of block 206 for preparation of the processing of the next input fragment. Output 203 of block 200 is connected with the input of block 207 for selecting the watermark elements and with the first output 203 (Yes) of block 209. Output 208 of block 207 is connected with block 209 where it is checked if all the watermark data elements have been processed. The second output 212 (No) of block 209 is connected with the input of the block 215 for transforming the watermark data elements into phase angles. Output 216 of block 215 is connected with the input of block 223 for phase modification. Output 204 of block 202 is connected with the first input of block 205 for setting the fragment data for processing. Output 210 of the last block is connected with the first input of block 221, which is the location where the calculation of the difference signal is controlled, and with the input of block 211, which is where the truncated orthogonal transform with the selected complex coefficients starts. Output 213 of the last block is connected with the input of block 214, which is where the transformation to polar coordinates is controlled. Output 217 of block 214 is connected with the input of block 218 for controlling the inverse polar coordinates transform and the inverse complex orthogonal transform, and with the input of block 219, which is where the adaptive threshold is defined and the coefficients, suitable for the watermarking, are selected. Output 222 of block 219 is connected with the second input of block 223 for phase modification, whose output 225 is connected with the input of block 228 where the inverse polar coordinates transform and the inverse complex transform are controlled. Output 230 of block 228 is connected with the first input of block 231, which is where the restoration of the watermarked signal is started. Output 220 of block 218 is connected with the second input of block 221, whose output 224 is connected with the input of block 226, which is where it is checked whether the last pyramid level for the fragment is processed, and with the second input of block 205. The first output 227 (No) of block 226 is connected with the second input of block 211, and the second output 229 (Yes) of block 226 is connected with the input of block 232 where it is checked whether the input data is already processed, and with the second input of block 231. The first output 234 (No) of block 232 is connected with the input of block 206, where the conditions for the processing of the next input fragment are prepared, and the second output 236 of block 232 controls the output of the coder in the case when the processing of the input file is finished. The output 233 of block 231 is connected with the input of block 235, where the inverse amplitude normalization of the watermarked signal starts, obtained at its output 237.

Figure 4:
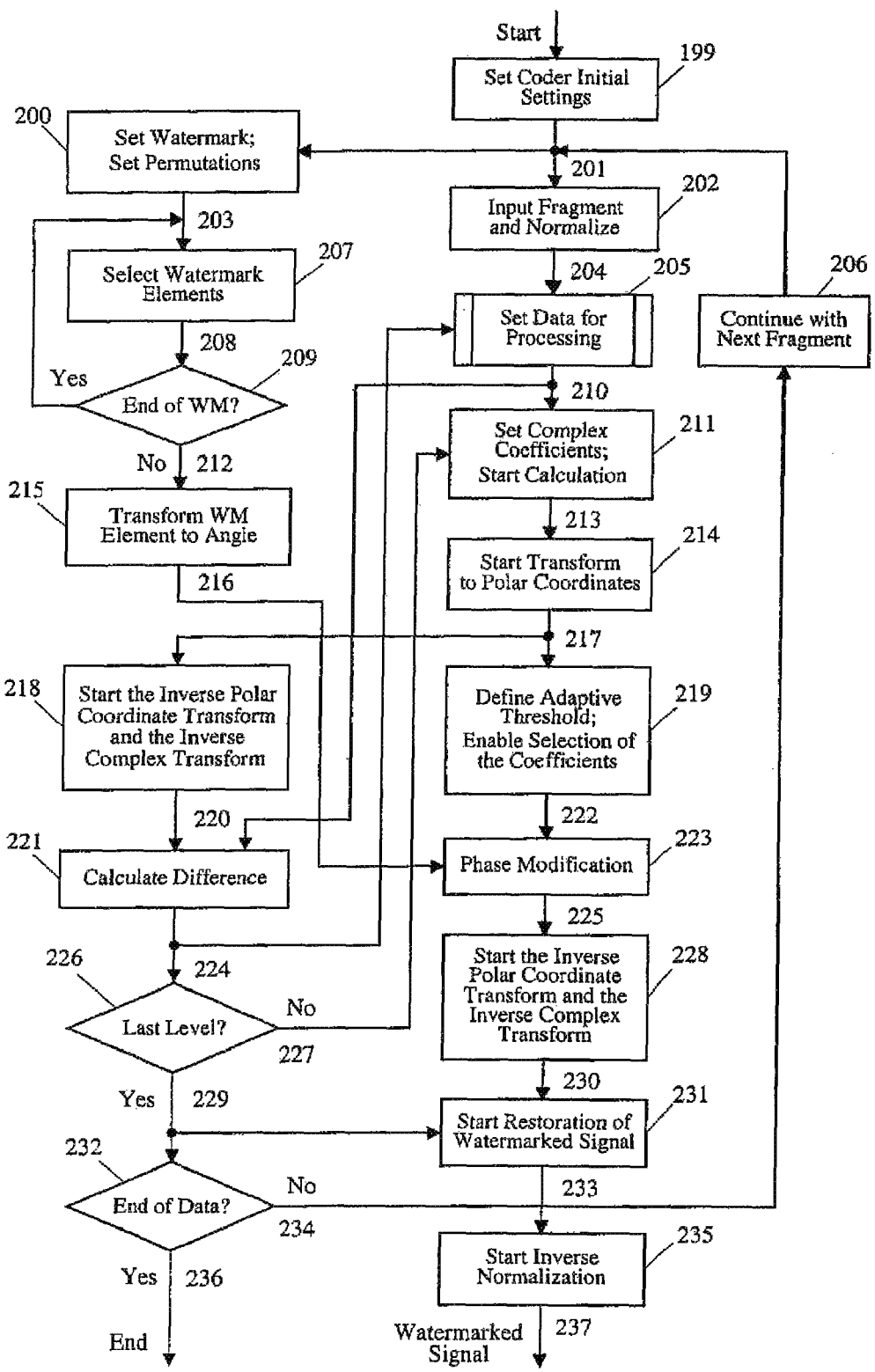
FIG. 4 is a block diagram of the control software for the encoder sub-system according to a preferred embodiment of the present invention.

In accordance with the preferred embodiment of the present invention the performance of the example control software for the apparatus for digital watermarking of media signals (the coder) is presented, in reference to FIG. 4. The processing starts when the start signal at the input of block 199 is obtained. Then in this block the preparation of the coder initial settings starts. These operations include: setting the input signal kind, the number of the pyramid levels, the used complex coefficients and the memory allocation. The processing continues in block 200 where the watermark data is set and its permutations are started. The processed signal enters block 202 where one fragment is selected and amplitude normalization of its data is performed. The normalized data is sent to block 205 where it is prepared for processing. The watermark data, prepared in block 200, is sent to block 207, where the watermark elements are selected that will be inserted in the processed fragment. Then the watermark data is checked to see if it has been finished in block 209. The answer "Yes" starts the repeated embedding of the same watermark data, and the answer "No" is sent to the input of block 215, where the selected watermark elements are transformed to angles.

The data from block 205 is sent to block 211, where the complex coefficients are set and their calculation begins. After that in block 214 the coefficients' values transformation to polar coordinates is performed. Then the processing continues in block 219, where the definition of the adaptive threshold and the selection of the coefficients is started. The data from block 214 is sent in block 218 where the inverse polar coordinates transform and the inverse complex transform operations are started. After that in block 221 the calculation of the difference between the signal approximation obtained in block 218 and the data from the output of the block 205 is performed. The data, obtained as a result of the processing in block 221, is sent to the second input of block 205 for further processing and to the input of block 226, where it is checked whether the last of the set pyramid levels had been processed. The result "No" of the corresponding output of block 226 is sent to the second input of block 211 and the processing continues. The result "Yes" of the corresponding output of block 226 is sent to the input of block 232 where it is checked if the processed data is finished. The result "No" of the corresponding output of block 232 is sent to the input of block 206 where the command for the processing of the next fragment is created. The result "Yes" at the output of the block 232 ends the performance of the coder.

The data from the output of block 219 is processed in block 223 where the phase modification of the selected coefficients is performed. At the second input of block 223 the data from the output of block 215 is entered. Then in block 228 the inverse polar coordinates transform and the inverse complex transform are performed. The processing continues in block 231 where the restoration of the watermarked signal is begun. At the second input of block 231 the result "Yes" is sent from block 226. At the end of the processing an inverse amplitude normalization is performed in block 235. The watermarked signal is obtained at output 237 of the coder.

Figure 5:
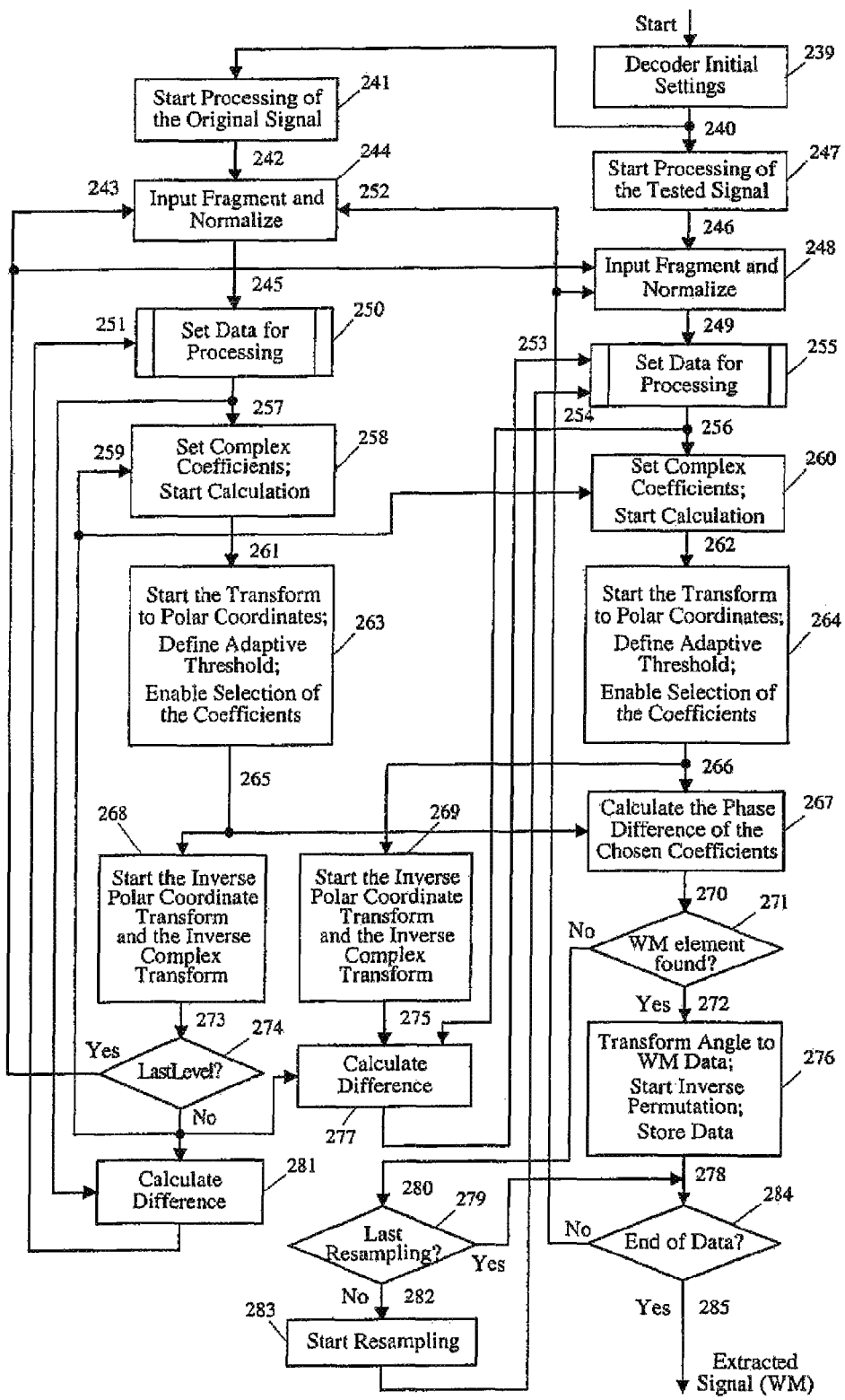
FIG. 5 is a block diagram of the control software for the decoder sub-system according to a preferred embodiment of the present invention.

The example implementation of the control software of the apparatus for digital watermark extraction in watermarked media signals (the decoder) in accordance with a preferred embodiment of the present invention is presented with reference to FIG. 5. It contains a block for decoder initial settings, blocks for selecting fragments from the tested and original signal, a block for preparing the data from the fragments of the tested and original signal for the processing, blocks for setting the complex coefficients, blocks for direct and inverse polar coordinates transforms, blocks for adaptive threshold calculation and for selection of the suitable coefficients, blocks for direct and inverse complex orthogonal transform, blocks for calculation of the difference signal data, a block for transformation of the phase angle into watermark data, a block for inverse permutations, a block for re-sampling, and blocks for processing control, including such functions as end of data and reached pyramid level.

The processing starts with the decoder initial settings preparation in block 239. Output 240 of this block is connected with the input of block 247 for processing of the tested signal and with the input of block 241 for processing of the original signal. Output 242 of block 241 is connected with the first input of block 244 for separating one fragment from the original signal and normalizing its data. The output 245 of the same block is connected with the first input of block 250 for setting data for processing. The output 257 of block 250 is connected with the first input of block 258 for setting the complex coefficients and starting their calculation. Output 261 of block 258 is connected with the input of block 263 for starting the transformation of the coefficients' values in polar coordinates, defining the adaptive threshold, and starting the selection of the coefficients suitable for watermarking. Output 265 of block 263 is connected with the input of block 268 for starting the inverse polar coordinates transform and the inverse complex transform, and with the first input of block 267 for calculating the phase difference of the chosen coefficients in the processed pair of fragments—one from the original signal, and the other from the tested one. Output 273 of block 268 is connected with the input of block 274 where it is checked if the last pyramid level had been processed. The first output 243 (Yes) of block 274 is connected with the second input of block 244 and with the second input of block 248. The second output 259 (No) of block 274 is connected with the first inputs of blocks 281 and 277 for calculation of the difference signal, and with the second inputs of blocks 258 and 260 for setting complex coefficients and starting their calculation. The second input of block 281 is connected with the output 257 of block 250. The output 251 of block 281 is connected with the second input of block 250. The output 246 of block 247 is connected with the first input of block 248. The output 249 of block 248 is connected with the input of the first input of block 255 for setting the fragment data for processing. The second input 253 of block 255 is connected with the output of block 277 for calculating the difference signal, and the third input 254 of block 255 is connected with the output of the block for re-sampling 283, whose input 282 is connected with the output (No) of block 279 for checking whether the last re-sampling for the tested fragment had been done. The output 256 of block 255 is connected with the first input of block 260 for setting the complex coefficients and starting their calculation and with the second input of block 277. Output 262 of block 260 is connected with the input of block 264 for starting the transformation of the coefficients' values in polar coordinates, defining of the adaptive threshold, and starting the selection of the coefficients suitable for the watermarking. Output 266 of block 264 is connected with the second input of block 267 and with the input of block 269 for starting the inverse polar coordinate transform and the inverse complex transform. Output 275 of block 269 is connected with the third input of block 277 for calculating the difference. Output 270 of block 267 is connected with the input of block 271 for checking whether a watermark element had been found. The first output (No) of block 271 is connected with input 280 of block 279 for checking whether the last re-sampling has been performed. The second output 272 (Yes) of block 271 is connected with the input of block 276 for transforming the phase angle to watermark data and for starting the inverse permutations. The output 278 of block 276 is connected with the input of block 284 for checking whether the whole amount of input data had been processed, and with the output (Yes) of block 279. The output (No) of block 284 is connected with the third inputs 252 of block 244 and of block 248, and the second output 285 (Yes) is the output of the decoder, where the extracted watermark is obtained.

Now in accordance with the preferred embodiment of the invention the performance of the control software of the apparatus for digital watermark extraction in watermarked media signals (the decoder) is presented, again with reference to FIG. 5. The processing starts when the start signal is obtained at the input of block 239. Then in this block the preparation of the initial settings of the decoder begins. These operations include setting the input signal kind, the number of the pyramid levels, the used complex coefficients, and the memory allocation. Then the processing continues with the separation of one input fragment from the original signal in block 241 and one from the tested signal in block 247. The processing of the selected fragment from the original signal starts in block 244 with amplitude normalization. Then in block 250 the data is set for processing. After that in block 258 the complex coefficients are set and their calculation is started. Next, in block 263 the transformation to polar coordinates, the calculation of the adaptive threshold, and the selection of the suitable coefficients begins. Similar processing is performed with the tested signal.

The amplitudes of the elements of the selected fragment are normalized in block 248. Then the data is set for processing in block 255. The obtained data is sent to blocks 277 and 260. In block 260 the complex coefficients are set and their calculation is started. Then in block 264 the transformation to polar coordinates begins, the adaptive threshold is selected, and suitable coefficients are calculated. The data obtained in blocks 263 and 264 is processed in block 267, where the calculation of the phase difference of the chosen coefficients starts for the processed fragments from the tested and the original signals. The data obtained in block 264 for the tested signal is processed in block 269, where the inverse polar coordinates transform and the inverse complex transform are started. The processing of the original signal continues in block 268 where the inverse polar coordinates transform and the inverse complex transform are started. Similar processing of the tested signal is performed in block 269. The processing of the data obtained in block 268 continues in block 274 where it is checked if the last pyramid level had been processed. The result "Yes" sends a command to blocks 244 and 248 to start the processing of the next fragments. The result "No" sends a command for the calculation of the difference signals for the original and for the tested signal to blocks 281 and 277. The difference signal from block 277 is sent to block 255, where the processing of the next pyramid level for the fragment of the tested signal begins.

After the end of the processing in block 267, it is checked in block 271 whether one or more watermark elements were found. The decision "No" starts a check as to whether the last resampling had been performed. This check is done in block 279. The decision "No" at the output of block 279 starts the re-sampling of the tested fragment data in block 283. The data obtained at the output of block 283 is transferred to the input of block 255 where it is prepared for the next processing. The decision "Yes" at the output of block 271 starts the performance of block 276, which includes the data transformation to angles and the inverse permutations. The output "Yes" of block 279 starts the check as to whether the processing of the input data had been finished. This check is done in block 284. This block is started with the output of block 276 as well. At the output of block 284 the extracted signal (the watermark) is obtained.

Figure 6:
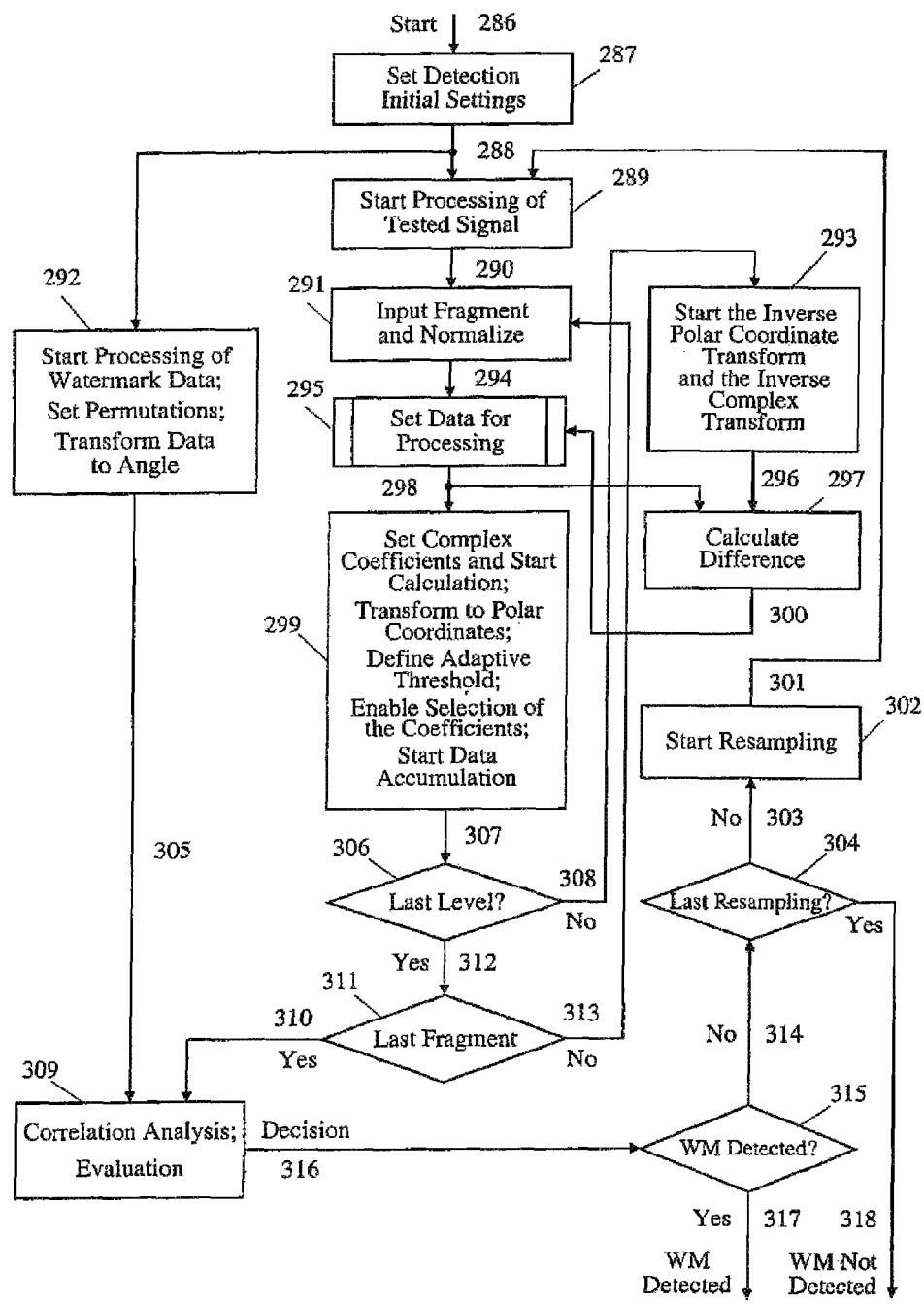
FIG. 6 is a block diagram of the control software for the detector sub-system according to a preferred embodiment of the present invention.

The example implementation in a preferred embodiment of the present invention of the control software of the apparatus for digital watermark detection in watermarked media signals (the detector) may now be described, with reference to FIG. 6. It contains a block for detector initial settings, blocks for selecting fragment from the tested signal, a block for amplitude normalization, blocks for direct and inverse polar coordinates transform, blocks for direct and inverse complex Hadamard transform, a block for calculation of the difference signal, a block for re-sampling, a block for watermark data processing, permutations and transformation into an angle, a block for re-sampling, and a block for correlation analysis and evaluation. The processing starts with the detector initial settings preparation in block 287. Output 288 of this block is connected with the first input of block 289 where the processing of the tested signal is started with the input of block 292 for processing of the watermark data. In block 292 the watermark data permutations are begun and the data transformations into angles. Output 290 of block 289 is connected with the input of block 291, where one fragment from the tested signal is separated and amplitude normalization is performed. Output 294 of block 291 is connected with the first input of block 295 where the data for the processing is set. Output 298 of block 295 is connected with the first input of block 297 for the calculation of the difference signal, and with the input of block 299, where the complex coefficients are set and the transformation to polar coordinates, the calculation of the adaptive threshold, and the selection of the coefficients and the data accumulation are begun. Output 307 of block 299 is connected with the input of block 306 where it is checked if the last pyramid level is processed. Output 312 (Yes) of block 306 is connected with the input of block 311 where it is checked if the last fragment of the tested signal is processed. Output 308 (No) of block 306 is connected with the input of block 293 where the inverse polar coordinate transform and inverse complex transform are started. Output 310 (Yes) of block 311 is connected with the first input of block 309 for correlation analysis and evaluation. Output 305 of block 292 is connected with the second input of block 309. Output 313 (No) of block 311 is connected with the second input of block 291. Output 296 of block 293 is connected with the second input of block 297. Output 300 of block 297 is connected with the second input of block 295. Output 316 of block 309 is connected with the input of block 315 where it is determined whether the watermark was detected. Output 314 (No) of block 315 is connected with the input of block 304 where it is checked if the last re-sampling is done. Output 303 (No) is connected with the input of block 302 where the re-sampling cycle is started. Output 301 of block 302 is connected with the second input of block 289. Output 318 (Yes) of block 304 is the output of the detector indicating that a watermark was not detected, and output 317 (Yes) of block 315 is the output of the detector indicating that a watermark was detected.

In accordance with the preferred embodiment of the present invention the performance of the control software of the apparatus for digital watermark detection in watermarked media signals (the detector) is presented, again with reference to FIG. 6. The processing starts when the start signal is obtained at input 286 of block 287. Then in this block the preparation of the initial settings of the detector begins. These operations include setting the input signal kind, the number of the pyramid levels, the used complex coefficients, and the memory allocation. After that, in block 292 the processing of the watermark data begins, including data permutations and then data transformation to angle. The processing of the tested signal starts in block 289. The processing continues in block 291, where one fragment is separated from the tested signal and then amplitude normalization is performed. Then the obtained data is set for the following processing in block 295.

The processing continues in blocks 299 and 297. The processing in block 299 includes the setting of the complex coefficients and their calculation, the start of the data transformation to polar coordinates, and the calculation of the adaptive threshold, then the suitable coefficients are selected and the data is accumulated. Then in block 306 it is checked whether the last pyramid level is processed. The output "Yes" of block 306 is connected with the input of block 311 where it is checked if the last fragment of the tested signal had been processed. In the case when the result from the analysis in block 311 is "Yes," the processing continues in block 309 for correlation analysis and evaluation. The second input of this block is connected with the output of block 292. The result "No" at the output of block 306 starts the processing in block 293, which enables the inverse polar coordinates transform and the inverse complex transform. The output of block 293 is connected with the input of block 297 for calculation of the difference signal. The second input of this block is connected with the output of block 295. Then the calculated difference is sent to the input of block 295, where the data is prepared for further processing.

The result "No" at the output of block 311 starts the processing in block 291, where the next fragment from the tested signal is selected. The output of block 309 starts the check as to whether there was detected a watermark in the tested input signal. This is performed in block 315. The decision "No" at the output of block 315 is sent to the input of block 304 where it is checked if the last re-sampling of the tested signal had been performed. The decision "Yes" of block 315 is the output of the detector and confirms the successful detection of the searched watermark. The output "No" of block 304 is connected with the input of block 302, which starts the tested fragment re-sampling. The output of block 302 is connected with the input of block 289, where the next processing cycle starts. The decision "Yes" of block 304 is the output of the detector, indicating that the searched watermark had not been detected in the tested signal.

The preferred embodiment of the invention as set forth herein has high imperceptibility, good robustness, and permits accurate detection. It can be applied to copyright notification, enforcement, and fingerprinting. It permits digital watermarking of various multimedia signals, including without limitation audio signals, still images, and video sequences. The watermarking of stereo audio signals may be performed in both channels independently with the same watermark data. Color images may preferably be presented with three components (matrices), each watermarked in accordance with the described method and apparatus, and for grayscale images only the brightness component may preferably watermarked. In the case when video sequences are watermarked, the processing should preferably be performed intra-frame and in real time.

It will be apparent that the present invention is applicable to a number of possible applications. These include intellectual property protection in multimedia products, such as music performances, films, electronic photograph collections, video libraries, photographic archives, and scanned documents, distributed via communication networks such as the Internet; intellectual property protection of radio and TV programs, broadcasted via earth, satellite or cable networks; proving the origin of multimedia products from the distributor to the end user; identification of fraud attempts that change the contents of electronic or scanned documents (i.e., "fingerprints" detection); embedding hidden information in medical images (such as private patient data) or in electronic geographic maps; hiding encrypted data in audio or video signals, transferred via the standard communications channels, with high resistance against unauthorized access to the hidden information, for use in surveillance video and video-conference systems; distance learning systems and in large multimedia databases; "searching agent" applications, that is, specialized software or hardware for data searching in the public medias such as the Internet, radio broadcasting, and the like; and detecting the illegal distribution of multimedia information.

The present invention has been described with reference to certain preferred and alternative embodiments that are intended to be exemplary only and not limiting to the full scope of the present invention as set forth in the appended claims.

We claim is:

1. A method for applying a digital watermark to a signal, comprising the steps of:
   (a) dividing the signal into a plurality of fragments;
   (b) recursively performing an inverse difference pyramid decomposition with respect to said fragments, resulting in a plurality of pyramid levels each comprising a set of spectrum coefficients;
   (c) calculating an adaptive threshold for each of the plurality of pyramid levels, wherein the adaptive threshold is calculated as the greater of (i) a fraction of a module of a largest spectrum coefficient and (ii) a predefined small positive value, and selecting a subset of spectrum coefficients from the set of spectrum coefficients based on the value of the adaptive threshold;
   (d) modifying the subset of spectrum coefficients with a watermark, resulting in a set of watermarked spectrum coefficients; and
   (e) constructing from said set of watermarked spectrum coefficients and those of the spectrum coefficients that are not modified a watermarked signal.

2. The method of claim 1, wherein said step of performing an inverse difference pyramid decomposition comprises the step of calculating for each pyramid level the set of spectrum coefficients by means of a transform.

3. The method of claim 2, wherein said step of constructing from said watermarked spectrum coefficients a watermarked signal comprises the step of applying the watermarked spectrum coefficients to an inverse transform.

4. The method of claim 3, wherein said transform comprises a complex Hadamard transform and said inverse transform comprises an inverse complex Hadamard transform.

5. The method of claim 2, further comprising the steps of calculating phases of said subset of spectrum coefficients wherein said step of modifying the subset of said spectrum coefficients with a watermark comprises the step of modifying the phases of the subset of said spectrum coefficients.

6. The method of claim 5, wherein said watermark comprises a plurality of watermark elements, further comprising the step of transforming said watermark elements to a set of watermark phase angles, and wherein said step of modifying the subset of said spectrum coefficients with a watermark comprises the step of modifying the subset of said spectrum coefficients with the set of watermark phase angles.

7. The method of claim 6, wherein said watermark elements are arranged in a pseudo-random sequence.

8. The method of claim 7, wherein said watermark elements are arranged in a pseudo-random sequence using a key.

9. The method of claim 5, wherein said step of modifying the subset of said spectrum coefficients with a watermark comprises the step of applying one set of watermark data at a first pyramid level, and applying a second set of watermark data at a second pyramid level.

10. The method of claim 5, wherein said subset of spectrum coefficients is comprised of low-frequency spectrum coefficients.

11. The method of claim 1, wherein said watermark may comprise one or more of author data, distributor data, title data, and owner data.

12. The method of claim 1, further comprising the step of normalizing an amplitude of each of said signal fragments.

13. The method of claim 12, wherein said step of normalizing the amplitude of said signal fragments comprises the steps of multiplying each signal fragment by a normalization coefficient, wherein said normalization coefficient is calculated by dividing a maximum possible amplitude by a maximum amplitude of the signal fragment.

14. A method of watermarking a signal, comprising the steps of:
   (a) dividing the signal into fragments;
   (b) performing a truncated complex orthogonal transform with respect to each fragment, resulting in an approximation of the signal comprising a set of zero-level spectrum coefficients;
   (c) calculating a zero-level adaptive threshold, wherein the zero-level adaptive threshold is calculated as the greater of (i) a fraction of a module of a largest zero-level spectrum coefficient and (ii) a predefined small positive value, and selecting a subset of the set of zero-level spectrum coefficients based on the value of the zero-level adaptive threshold, then applying a first set of watermark data to the subset of the set of zero-level spectrum coefficients;
   (d) calculating a difference between the signal and the approximation of the signal with respect to each fragment;
   (e) dividing the calculated difference into a plurality of sub-fragments;
   (f) performing a truncated complex orthogonal transform with respect to each sub-fragment, resulting in a set of first-level spectrum coefficients;
   (g) calculating a first-level adaptive threshold, wherein the first-level adaptive threshold is calculated as the greater of (i) a fraction of a module of a largest first-level spectrum coefficient and (ii) the predefined small positive value, and selecting a subset of the set of first-level spectrum coefficients based on the value of the first-level adaptive threshold, then applying a second set of watermark data to the subset of the set of first-level spectrum coefficients;

(h) performing a series of inverse complex orthogonal transforms with respect to said fragments and sub-fragments, and adding to the result of such transforms a part of the signal which remained unchanged, resulting in a watermarked signal.

15. The method of claim 14, wherein said orthogonal transform comprises a complex Hadamard transform and said inverse orthogonal transform comprises an inverse complex Hadamard transform.

16. The method of claim 14, wherein said first set of watermark data comprises one of author data, distributor data, title data, broadcaster data, and owner data, and said second set of watermark data comprises a different one of author data, distributor data, title data, broadcaster data, and owner data.

17. The method of claim 14, wherein each of said signal fragments comprises an amplitude, the method further comprising the step of inverse normalizing the amplitude of each of said signal fragments.

18. A method for extracting a digital watermark from a first signal utilizing a second signal, comprising the steps of:
(a) dividing the first and second signals into a plurality of fragments;
(b) recursively performing an inverse difference pyramid decomposition with respect to the fragments, resulting in a plurality of pyramid levels each comprising a set of spectrum coefficients with respect to each signal;
(c) calculating an adaptive threshold for each of the plurality of pyramid levels, wherein the adaptive threshold is calculated as the greater of (i) a fraction of a module of a largest spectrum coefficient and (ii) a predefined small positive value, and selecting a subset of spectrum coefficients from the set of spectrum coefficients based on the value of the adaptive threshold;
(d) comparing the subset of the spectrum coefficients from the first signal with the subset of the spectrum coefficients from the second signal obtaining a comparison result; and
(e) assembling a watermark from the first signal by means of inverse permutations with respect to the comparison result.

19. The method of claim 18, wherein said step of performing an inverse difference pyramid decomposition comprises the step of calculating for each pyramid level the set of spectrum coefficients by means of a transform.

20. The method of claim 19, wherein said transform comprises a complex Hadamard transform.

21. The method of claim 20, further comprising the steps of calculating a phase for each of the subsets of spectrum coefficients, and wherein said step of comparing the subset of the spectrum coefficients from the first signal with the subset of the spectrum coefficients from the second signal comprises the step of comparing the phases of each of the subsets of spectrum coefficients.

22. The method of claim 20, wherein said step of comparing the subset of the spectrum coefficients from the first signal with the subset of the spectrum coefficients from the second signal comprises the step of comparing the subset of the spectrum coefficients from the first signal with the subset of the spectrum coefficients from the second signal at a first pyramid level, and comparing the subset of the spectrum coefficients from the first signal with the subset of the spectrum coefficients from the second signal at a second pyramid level.

23. The method of claim 20, wherein said step of comparing the subset of the spectrum coefficients from the first signal with the subset of the spectrum coefficients from the second signal utilizes a key.

24. A method of extracting a watermark from a first signal utilizing a second signal not containing a watermark, comprising the steps of:
(a) dividing the first signal and the second signal into fragments;
(b) performing a truncated complex orthogonal transform with respect to each fragment, resulting in an approximation of the signals comprising a set of zero-level spectrum coefficients;
(c) calculating a zero-level adaptive threshold, wherein the zero-level adaptive threshold is calculated as the greater of (i) a fraction of a module of a largest zero-level spectrum coefficient and (ii) a predefined small positive value, and selecting a subset of the set of zero-level spectrum coefficients based on the value of the zero-level adaptive threshold, then comparing the subset of zero-level spectrum coefficients of the first signal to the subset of zero-level spectrum coefficients of the second signal to extract a zero-level difference of spectrum coefficients;
(d) calculating a difference between each signal and an approximation of each signal with respect to each fragment;
(e) dividing the calculated difference into a plurality of sub-fragments;
(f) performing a truncated complex orthogonal transform with respect to each sub-fragment of each signal, resulting in a set of first-level spectrum coefficients;
(g) calculating a first-level adaptive threshold, wherein the first-level adaptive threshold is calculated as the greater of (i) a fraction of a module of a largest first-level spectrum coefficient and (ii) the predefined small positive value, and selecting a subset of the set of first-level spectrum coefficients based on the value of the first-level adaptive threshold, then comparing the subset of first-level spectrum coefficients of the first signal to the subset of first-level spectrum coefficients of the second signal to extract a first-level difference of spectrum coefficients; and
(h) combining the zero-level difference of spectrum coefficients with the first-level difference of spectrum coefficients to result in a watermark.

25. The method of claim 24, wherein said orthogonal transform comprises a complex Hadamard transform.

26. A method for detecting a digital watermark in a signal, comprising the steps of:
(a) dividing the signal into a plurality of fragments;
(b) recursively performing an inverse difference pyramid decomposition with respect to the fragments of the signal, resulting in a plurality of pyramid levels comprising a set of spectrum coefficients with respect to the signal;
(c) calculating an adaptive threshold for each of the plurality of pyramid levels wherein the adaptive threshold is calculated as the greater of (i) a fraction of a module of a largest spectrum coefficient and (ii) a predefined small positive value and utilizing the adaptive threshold at each of the plurality of pyramid levels to select a subset of spectrum coefficients;
(d) comparing the subset of the spectrum coefficients with the watermark to obtain a comparison result; and
(e) comparing a detection threshold with the comparison result to determine if the watermark is found in the signal.

27. The method of claim 26, wherein said step of performing an inverse difference pyramid decomposition comprises the step of calculating for each pyramid level a set of spectrum coefficients by means of a transform.

28. The method of claim 27, wherein said transform comprises a complex Hadamard transform.

29. The method of claim 28, further comprising the step of calculating a set of phases of the subset of spectrum coefficients, wherein said step of comparing the subset of the spectrum coefficients with the watermark comprises the step of comparing the phases of the subset of spectrum coefficients with the watermark.

30. The method of claim 28, wherein said step of comparing the subset of the spectrum coefficients with the watermark to obtain a comparison result comprises the processing of the subset of the spectrum coefficients with a key.

31. The method of claim 30, wherein said watermark comprises one of author data, distributor data, title data, broadcaster data, and owner data.

32. The method of claim 26, wherein said step of comparing the subset of spectrum coefficients with the watermark comprises the steps of parsing the watermark into a set of watermark elements corresponding to each of the pyramid levels, and comparing each watermark element with the subset of the spectrum coefficients for a corresponding pyramid level.

33. A method of detecting a watermark in a signal, comprising the steps of:
    (a) dividing the signal into fragments;
    (b) performing a truncated complex orthogonal transform with respect to each signal fragment, resulting in an approximation of the signal comprising a set of zero-level spectrum coefficients;
    (c) calculating a zero-level adaptive threshold, wherein the zero-level adaptive threshold is calculated as the greater of (i) a fraction of a module of a largest zero-level spectrum coefficient and (ii) a predefined small positive value, utilizing the zero-level adaptive threshold to produce a subset of zero-level spectrum coefficients, and comparing the subset of zero-level spectrum coefficients of the signal to a corresponding watermark element to generate a zero-level watermark result;
    (d) calculating a difference between each signal and the approximation of each signal with respect to each fragment;
    (e) dividing the calculated difference into a plurality of sub-fragments;
    (f) performing a truncated complex orthogonal transform with respect to each sub-fragment of the signal, resulting in a set of first-level spectrum coefficients;
    (g) calculating a first-level adaptive threshold, wherein the first-level adaptive threshold is calculated as the greater of (i) a fraction of a module of a largest first-level spectrum coefficient and (ii) the predefined small positive value, utilizing the first-level adaptive threshold to produce a subset of first-level spectrum coefficients, and comparing the subset of first-level spectrum coefficients of the signal to a corresponding watermark element to generate a first-level watermark result; and
    (h) comparing a detection threshold with a construction based on the zero-level watermark result and first-level watermark result to determine if the watermark is found in the signal.

34. The method of claim 33, wherein said orthogonal transform comprises a complex Hadamard transform.

35. An apparatus for applying a watermark to a signal, comprising:
    (a) a transform module comprising a plurality of discrete electronic components operable to receive a segment of the signal and recursively derive a set of spectrum coefficients;
    (b) a permutation module operable to receive the watermark and a key and return an encoded watermark;
    (c) an adaptive threshold module operable to calculate an adaptive threshold wherein the adaptive threshold is calculated as the greater of (i) a fraction of a module of a largest spectrum coefficient and (ii) a predefined small positive value;
    (d) a comparator and summator module collectively operable to select a subset of spectrum coefficients from the set of spectrum coefficients based on the value of the adaptive threshold;
    (e) a watermarking module operable to receive the subset of the set of spectrum coefficients from said summator module and said encoded watermark from said permutation module and return a transformed watermarked signal comprising a set of modified spectrum coefficients; and
    (f) an inverse transform module operable to receive a transformed watermarked signal comprising a set of modified spectrum coefficients and those of the spectrum coefficients that are not modified and return a watermarked signal.

36. The apparatus of claim 35, wherein said transform module is operable to perform a complex Hadamard transform and said inverse transform module is operable to perform an inverse complex Hadamard transform.

37. The apparatus of claim 36, further comprising:
    (a) a coordinate transform module operable to receive the subset of spectrum coefficients and return a module and phase corresponding to the subset of spectrum coefficients; and
    (b) a watermark phase transform module, operable to receive the encoded watermark and return a phase-transformed encoded watermark,
wherein said module and phase corresponding to the subset of spectrum coefficients, and said phase-transformed encoded watermark, are received by said watermarking module.

38. The apparatus of claim 37, wherein said watermark may comprise one or more of author data, distributor data, title data, and owner data.

39. The apparatus of claim 35, further comprising:
    (a) a normalization module operable to receive the signal and return a normalized signal; and
    (b) an inverse normalization module operable to receive the watermarked signal and return an inverse normalized watermark signal,
wherein said normalized signal is received by said transform module.

40. The apparatus of claim 39, wherein said normalization module is operable to multiply a signal fragment by a normalization coefficient, wherein said normalization coefficient is calculated by dividing a maximum possible amplitude by a maximum amplitude of the signal fragment.

41. The apparatus of claim 40, wherein said inverse normalization module is operable to divide a signal fragment by the normalization coefficient.

42. An apparatus for extracting a watermark from a first signal utilizing a second signal, comprising:
  (a) a first transform module comprising a plurality of discrete electronic components operable to receive the first signal and recursively derive a first set of spectrum coefficients;
  (b) a second transform module operable to receive the second signal, and to calculate and return a second set of spectrum coefficients;
  (c) an adaptive threshold module operable to produce a first adaptive threshold from which a first subset of spectrum coefficients based on the first set of spectrum coefficients is selected, wherein the first adaptive threshold is calculated as the greater of (i) a fraction of a module of a largest spectrum coefficient from the first set of spectrum coefficients and (ii) a predefined small positive value, and to produce a second adaptive threshold from which a second subset of spectrum coefficients based on the second set of spectrum coefficients is selected wherein the second adaptive threshold is calculated as the greater of (i) a fraction of a module of a largest spectrum coefficient from the second set of spectrum coefficients and (ii) the predefined small positive value;
  (d) a comparator module operable to calculate a difference between the first subset of the first set of spectrum coefficients with the second subset of the second set of spectrum coefficients and return a transformed encoded watermark; and
  (e) an inverse transform module operable to receive a key and the transformed encoded watermark and return the watermark.

43. The apparatus of claim 42, wherein said first and second transform modules are operable to perform a complex Hadamard transform.

44. The apparatus of claim 43, further comprising:
  (a) a first coordinate transform module operable to receive the subset of the first set of spectrum coefficients and return a module and phase corresponding to said subset of the first set of spectrum coefficients; and
  (b) a second coordinate transform module operable to receive the subset of the second set of spectrum coefficients and return a module and phase corresponding to said subset of the second set of spectrum coefficients.

45. The apparatus of claim 42, further comprising a normalization module operable to receive the signal and return a normalized signal.

46. The apparatus of claim 45, wherein said normalization module is operable to multiply a signal fragment by a normalization coefficient, wherein said normalization coefficient is calculated by dividing a maximum possible amplitude by a maximum amplitude of the signal fragment.

47. An apparatus for detecting a watermark in a signal, comprising:
  (a) a transform module comprising a plurality of discrete electronic components operable to receive a segment of the signal and recursively derive a set of spectrum coefficients;
  (b) a permutation module operable to receive the watermark and a key and return an encoded watermark;
  (c) an adaptive threshold module operable to calculate an adaptive threshold wherein the adaptive threshold is calculated as the greater of (i) a fraction of a module of a largest spectrum coefficient and (ii) a predefined small positive value;
  (d) a comparator and summator module collectively operable to select a subset of spectrum coefficients from the set of spectrum coefficients based on the value of the adaptive threshold;
  (e) a correlation module operable to determine a watermark correlation factor between the subset of spectrum coefficients and the encoded watermark; and
  (f) a watermark comparator module operable to compare the watermark correlation factor to a watermark threshold, and return a watermark detection result.

48. The apparatus of claim 47, wherein said transform module is operable to perform a complex Hadamard transform.

49. The apparatus of claim 48, further comprising:
  (a) a coordinate transform module operable to receive the subset of spectrum coefficients and return a module and phase corresponding to the subset of spectrum coefficients; and
  (b) a watermark phase transform module, operable to receive the encoded watermark and return a phase-transformed encoded watermark,
wherein said module and phase corresponding to the subset of spectrum coefficients, and said phase-transformed encoded watermark, are received by said correlation module.

50. The apparatus of claim 47, further comprising a normalization module operable to receive the signal and return a normalized signal, wherein said normalized signal is received by said transform module.

51. The apparatus of claim 50, wherein said normalization module is operable to multiply a signal fragment by a normalization coefficient, wherein said normalization coefficient is calculated by dividing a maximum possible amplitude by a maximum amplitude of the signal fragment.

* * * * *